(12) United States Patent
Halliday

(10) Patent No.: US 8,347,997 B2
(45) Date of Patent: *Jan. 8, 2013

(54) SYSTEM AND METHOD FOR ARMORING VEHICLES USING A HULL HAVING A BLAST VENT

(75) Inventor: Donald R. Halliday, Powell, OH (US)

(73) Assignee: Hal-Tech Limited, Plain City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,841

(22) Filed: May 2, 2012

(65) Prior Publication Data
US 2012/0240759 A1    Sep. 27, 2012

Related U.S. Application Data

(63) Continuation of application No. 12/344,630, filed on Dec. 29, 2008, now Pat. No. 8,205,703.

(51) Int. Cl.
*B62D 23/00* (2006.01)
*F41H 5/14* (2006.01)

(52) U.S. Cl. ........... 180/89.1; 296/187.07; 296/193.04; 89/36.09; 89/929

(58) Field of Classification Search ........... 180/89.1, 180/89.11; 280/748, 785; 296/187.07, 193.01, 296/193.03, 193.04, 193.05, 19, 37.6; 89/36.05, 89/36.07, 36.08, 36.09, 929; 2/2.5, 6.6, 6.7; 114/61.1; D12/311, 312; 440/12.56, 12.63, 440/12.64

See application file for complete search history.

(56) References Cited

U.S. PATENT DOCUMENTS

| | | | | |
|---|---|---|---|---|
| 3,983,832 | A * | 10/1976 | Kinder | 440/12.63 |
| 4,944,240 | A * | 7/1990 | Morris | 114/283 |
| 5,540,170 | A * | 7/1996 | Purdy | 114/61.18 |
| 2011/0148147 | A1* | 6/2011 | Tunis et al. | 296/187.07 |
| 2012/0193940 | A1* | 8/2012 | Tunis et al. | 296/187.07 |

OTHER PUBLICATIONS

Burrell & Soltesz, HMMWV Improvements "Monster Garage" program, U.S. Army Research, Development and Engineering Command, Tank Automotive Research, Development, and Engineering Center, pp. 1-6, retreival date: Jun. 6, 2012, available at http://www.dtic.mil/dtic/tr/fulltext/u2/a494483.pdf.

Burrell & Soltesz, HMMWV Improvements "Monster Garage" program, U.S. Army Research, Development and Engineering Command, Tank Automotive Research, Development, and Engineering Center, pp. 1-6, retrieval date: Jun. 6, 2012, available at http://www.dtic.mil/dtic/tr/fulltext/u2/a504192.pdf.

* cited by examiner

*Primary Examiner* — Joseph Rocca

(74) *Attorney, Agent, or Firm* — James R. Klaiber; Pryor Cashman LLP

(57) ABSTRACT

A modular, wheeled vehicle suitable for military use, includes a driver module having a width for seating one person and having length for seating a second (and optional third) person therebehind, and an engine module disposed behind the driver module containing an engine for powering the modular vehicle. The engine module has a rear surface adapted to receive a storage module. The driver module and the engine module form a central element having a pair of sides, a bottom, and a top. The central element is adapted to receive the modules on both of the central element sides. The central element has air inlet for personnel and for the engine disposed atop the central element. The bottom of the central element and troop side pods generally are V-shaped with slanted, upward extending sides.

22 Claims, 29 Drawing Sheets

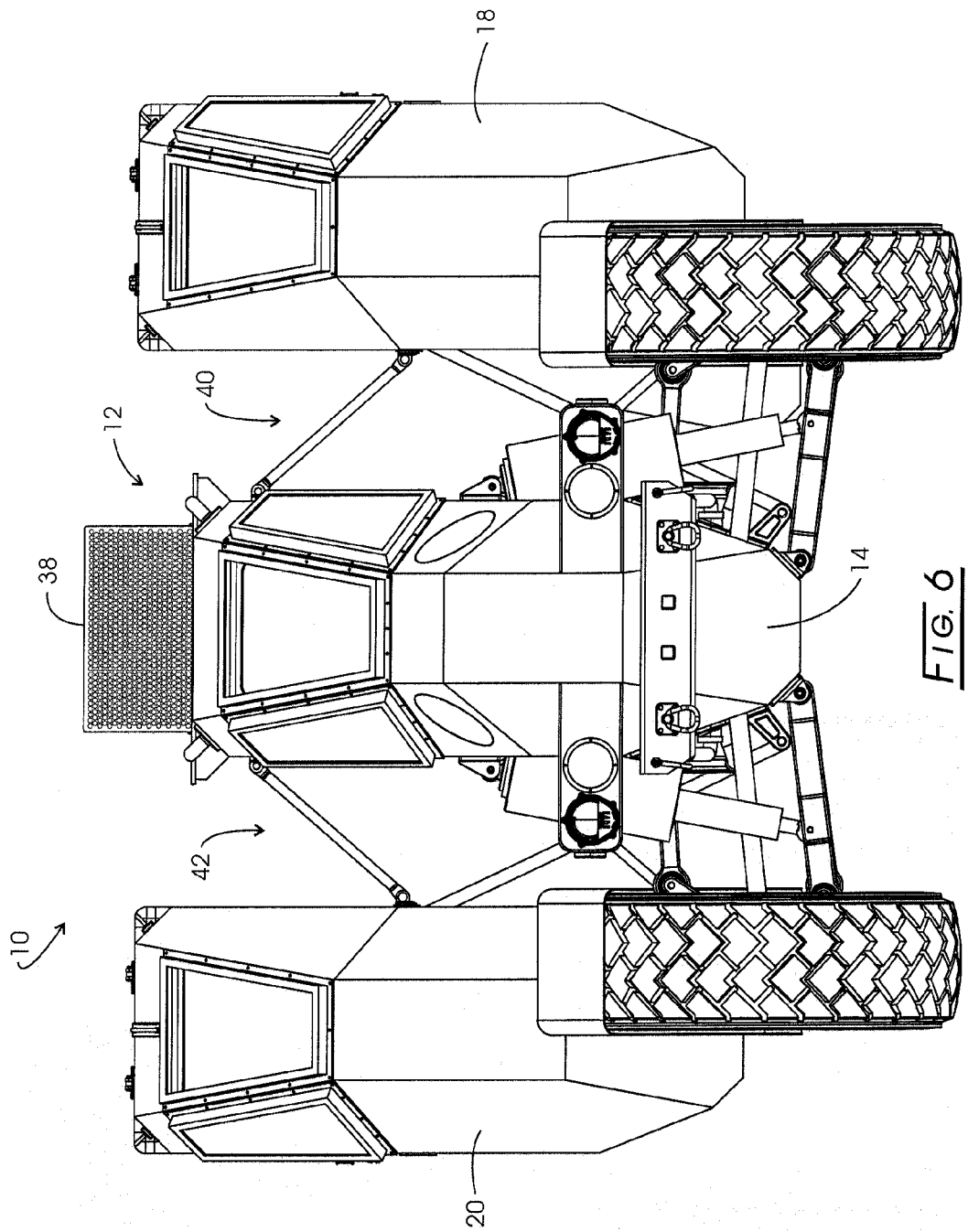

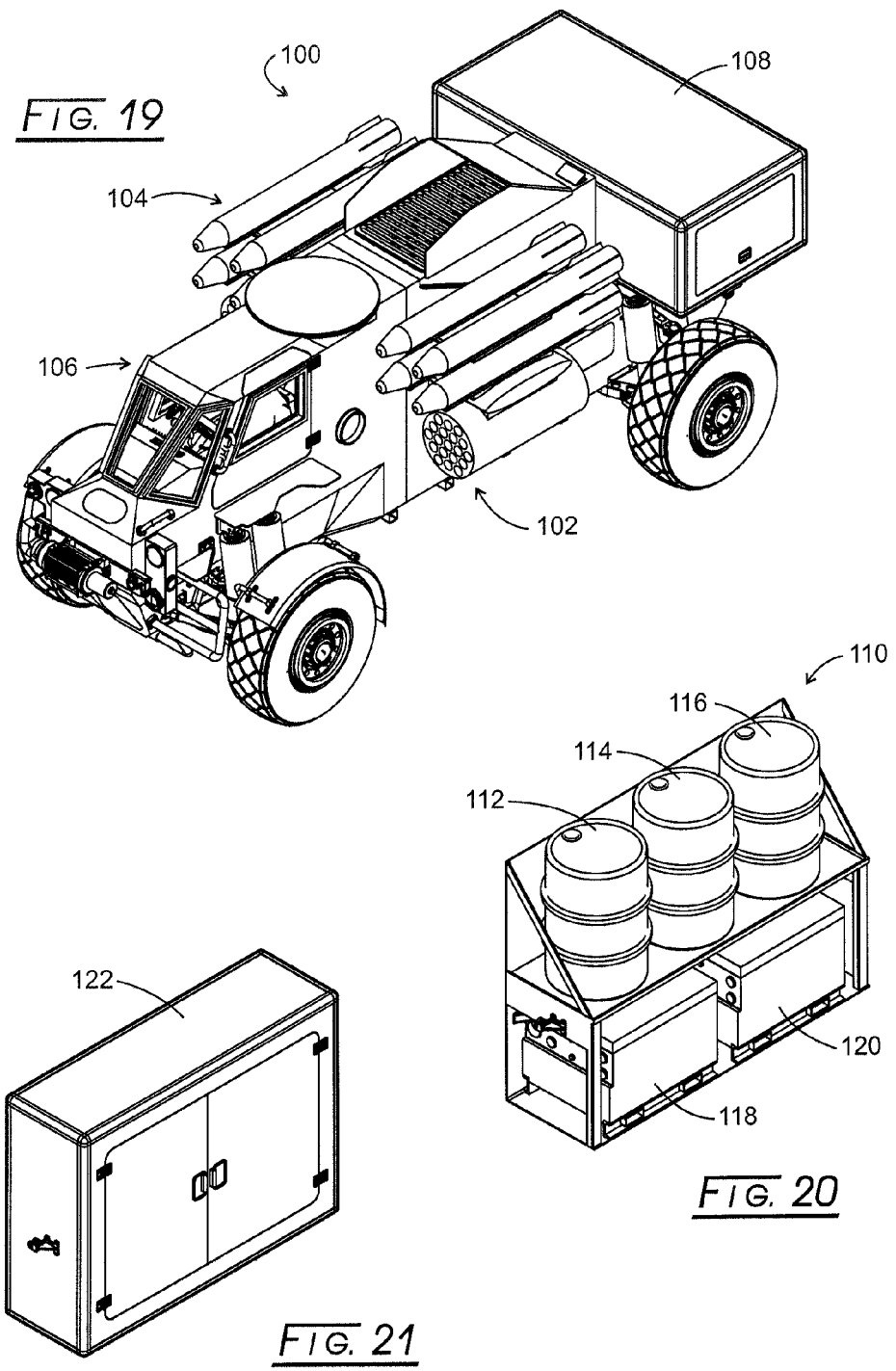

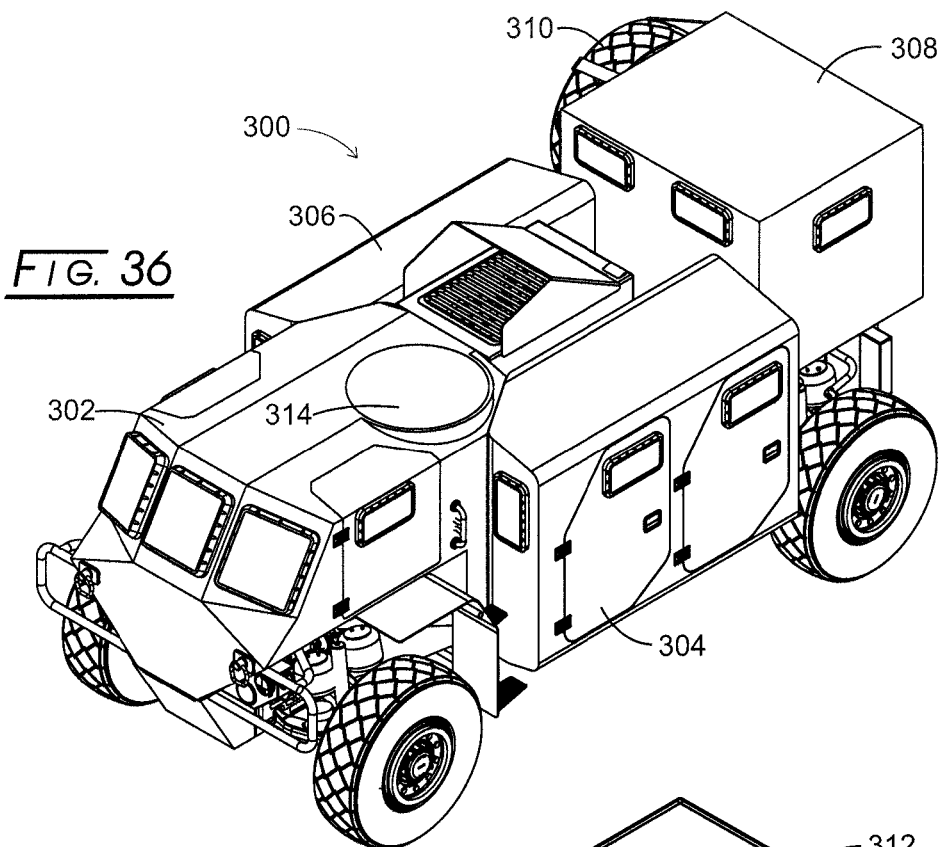
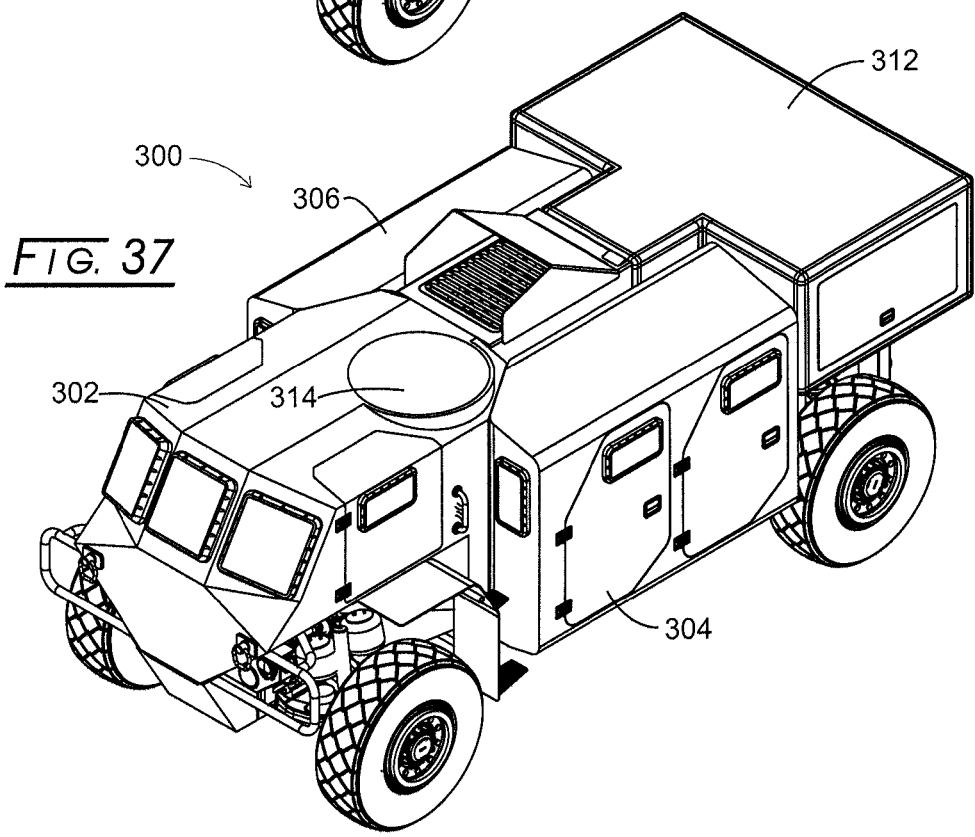

SYSTEM AND METHOD FOR ARMORING VEHICLES USING A HULL HAVING A BLAST VENT

CROSS-REFERENCE TO RELATED APPLICATIONS

This application is a continuation of application Ser. No. 12/344,630 filed on Dec. 29, 2008 now U.S. Pat. No. 8,205,703, the disclosure of which is incorporated herein by reference.

STATEMENT REGARDING FEDERALLY SPONSORED RESEARCH

Not applicable.

BACKGROUND

The present disclosure relates to motorized vehicles suitable for military use and more particularly to a modular military vehicle that can be adapted for non-military uses.

A multi-purpose vehicle, suitable for military, homeland security, disaster/emergency response, and other uses, should be versatile. It should be able to protect the operators and be highly deliverable to any site, adaptable, maintainable, and agile. Also, it should be armored and operable over rugged terrain and hostile environments, including, for example, desert and frigid conditions. Such vehicle further should be highly maneuverable.

It is such a vehicle that the present disclosure is addressed.

BRIEF SUMMARY

The disclosed modular vehicle is compartmentalized through modular, severable, frangible sub-systems or components with a view to isolating effects of ballistic shock/blast and other undesirable kinetic forces.

Modularity includes a central driver module and engine module, which form a central chassis module or CCM. The driver module is capable of carrying, for example, 1 to 3 people, and can be common in design regardless of function and/or use. Pods, then, can be attached to the central module to provide different functions including, for example, troop carrier, ambulance, cargo, etc. Such design allows the army to transport pods and not fully dedicated (i.e., single use) vehicles.

The engine module bolts directly to the central driver module as a complete unit. Pods are more readily transported to other field areas of need, so long as at the new site has the means to attach/detach such pods to the CCM.

The CCM and side pods present three V-shaped hulls on their underside. Such a blast-deflecting design along with side pod frangibility and engine module open framework should significantly increase the venting of the blast reducing the penetration and deformation of the area where people are sitting. The smallest flat area facing the ground now can be less than about 10 inches (25.4 cm) in width.

Engine and gearbox together are separate and located to the rear of the driver module. This design isolates heat, noise, fumes etc., from the driver module and personnel therein significantly increasing the ability of the occupants to perform their duty when they leave the vehicle.

The relatively common cross-sectional shape of all modules allows for a design that is very simple to manufacture. The detachable rear bulkhead of the driver module and troop carrying pods allows for ease of fitting a spall liner, the shrapnel anti intrusion layer, inside the vehicle. Because of this removable bulkhead, the spall liner can be large in size improving its ability to counter intrusion of shrapnel.

With the side pods removed, the narrow engine module design allows for ease of maintenance of the engine, because of a closer proximity to the engine components by technicians working on the engine/gearbox section. It is intended that this engine module be manufactured with a tubular frame allowing significant blast venting between the two-crew side modules increasing survivability of the crew. Placing the engine/drive module in the center of the vehicle reduces the possibility of these components being damaged and disabling the vehicle with small arms fire. By simply creating small top and rear armored panels these drive elements become well protected. In summary, this engine/drive placement allows excellent blast venting and provides good small arms fire protection.

The air inlet duct is located above the vehicle and is retractable in case the vehicle needs to be transported, for example, in a marine vessel (76" or 1.93 m) height. Locating the cooling and engine air inlet high allows for less contamination of air with dust, and when using the vehicle in hot environments this high inlet position allows the air temperature to the cooling systems to be substantially lower than using air adjacent to the road surface, etc.

The pods can be designed to swing out either in a parallel fashion or in a door fashion incorporating as well a frangible system or the pods can be attached in such a way with a 4 bar linkage the pods can merely be located to the CCM by means of the clip system later disclosed (See FIG. 6A)—all methods can become detached by fracture of a frangible fastening device.

4-wheel drive is achieved by passing the driveshaft under or beside the engine and personnel seated in the CCM to the differential housing located under the driver in the driver module. This may require the addition of a two or three shaft oblique transfer module that allows minimization of driveshaft angle. This oblique transfer module can be placed at the interface between the driver and engine modules.

The basic design admits of carrying from 1 to 7 people. Additional crew can be carried in additional pods at the rear of the CCM. Alternatively, the wheelbase can be lengthened, by about 30" (106.2 cm) by extending the rear central module or the driver module. The pods similarly then can be increased and an extra person can be included in each pod; thus, increasing the total vehicle capacity to 9 people instead of 7. Increasing the wheelbase by 30" (106.2 cm) also allows an alternate ambulance 'low rise' side pod to be fitted in between the wheels, allowing transportability in a 76" (1.93 m) height. Similarly the concept can be used as a 3-person carrier by reducing the CCM front to a single person with single person pods; thus, allowing substantial carrying capacity rear of the engine area.

Each person in the vehicle further can be fitted with a helmet protective collar, such as is used in high speed automobile racing, to help reduce acceleration effects on the lower neck during an explosion. Similarly, the occupants can wear an extended rear ballistic panel (SAPI panels—small arms protection inserts) to allow for increased protection and also to act as helmet support (with straps) to avoid the possible separation of the top spinal cord in the event of extreme accelerations on the head relative to the body. This extension located behind the helmet can serve three functions. The first function is to act as a ballistic barrier for the area of the neck and upper torso. The second function is to serve as helmet support should the soldier be exposed to forces, which may serve to separate the head from the spinal cord in a vehicular accident or similar. Third, soldiers' helmets can often withstand direct rounds on the helmet, but it is desirable for there to be some means to reduce the energy the neck experiences, so that any additional support from the lower torso will help the soldier survive the impact of this round on a helmet. It is thought that this SAPI panel will be secured with Velcro® into position within the soldier's ballistic vest and with the soldiers' ballistic collar. It is thought that a pivot at the top of this extended SAPI panel should be incorporated to allow the head to be turned easily and with comfort.

For commercial or civilian (non-military) uses of the disclosed modular vehicle, their use and fuel efficiency drives many vehicle designs. Reducing the vehicle weight and/or improving the aerodynamic drag of the vehicle improve fuel efficiency of the disclosed modular vehicle.

Having removable pods will allow the user to only use the pods that are needed at that time. With the resultant weight reduction and narrow aerodynamic shape, fuel economy is improved. Typical US pickups are adaptable as multi-use vehicles carrying 4 to 5 people and cargo. The disclosed modular vehicle achieves such uses with a side-to-side split of functionality. That is, the modular vehicle has a CCM capable of carrying 2 people and which is common in all configurations. The side pods, which attach to this CCM, have different functions including, for example, carrying people in people pod on a single side or both, carrying cargo in pods that are relatively low to the ground and tall in height, sleeping pods, etc. If required, as with the military design, the commercial modular vehicle can include 4-wheel drive.

The central pod can be narrow and aerodynamic with aerodynamic suspension attachment legs and wheel aerodynamic pods to reduce drag. The rear aerodynamic pods can be removed when adding any side pod, which also will incorporate an aerodynamic covered surface.

BRIEF DESCRIPTION OF THE DRAWINGS

For a fuller understanding of the nature and advantages of the present modular vehicle, reference should be had to the following detailed description taken in connection with the accompanying drawings, in which:

FIG. 6 is a front view like that in FIG. 1 with the side pods deployed;

FIG. 19 is an isometric view of the modular military vehicle fitted with side armament that includes missiles, and a rear storage module for carrying, for example, extra armament, missiles, or the like;

FIG. 20 is an isometric view of a side pod transport for conveying electrical generators and fuel drums;

FIG. 21 is an isometric view of a side pod transport configured as a storage cabinet;

FIG. 36 is an isometric view of a troop carrier embodiment of the modular military vehicle having an enlarged driver module suitable for up to, for example, 3 troops to occupy, troop side pods, and rear troop pod; and FIG. 37 is an isometric view of a troop carrier embodiment of the modular military vehicle with enlarged driver module, troop side pods, and rear storage pod.

Figure 1:
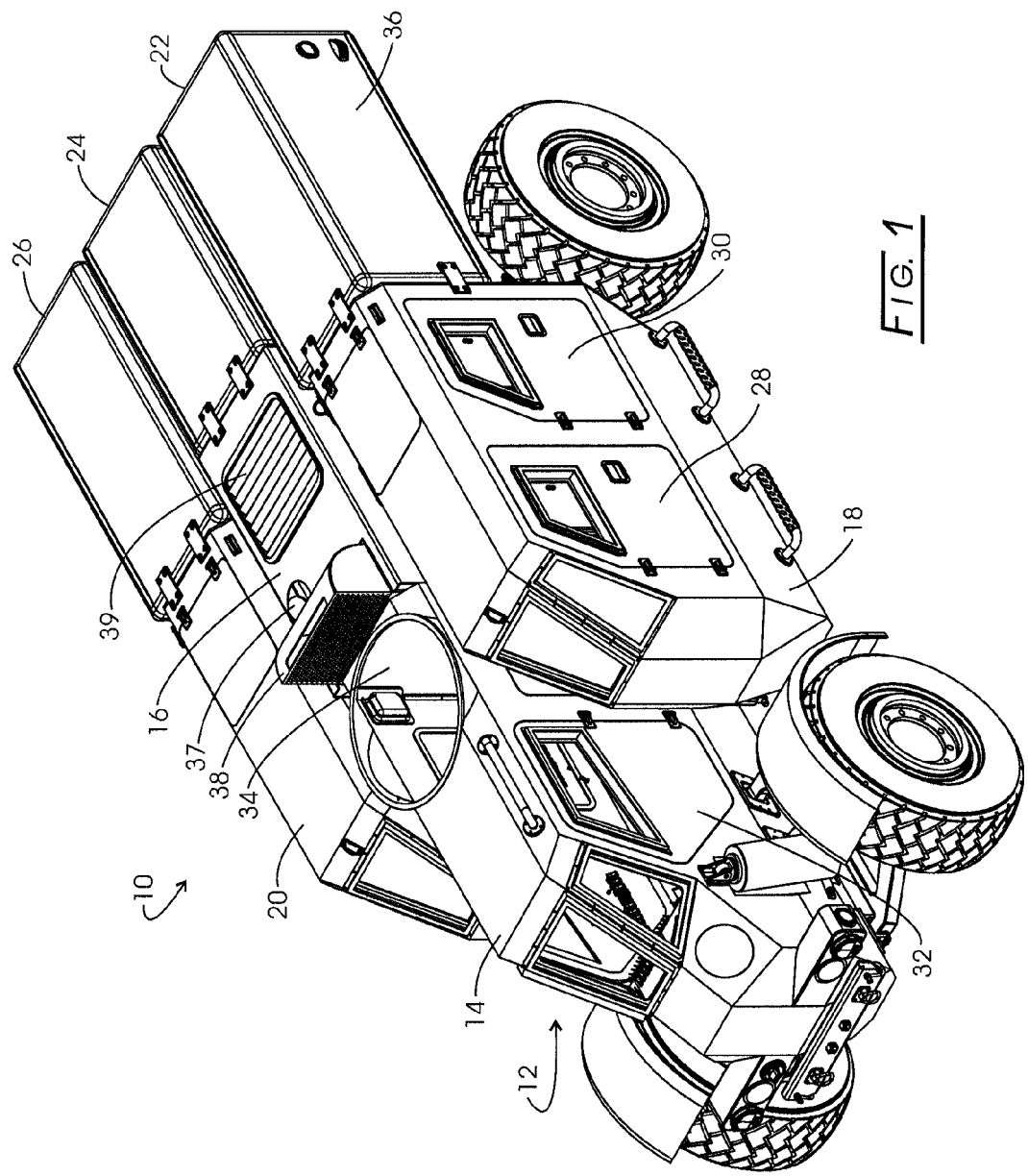
FIG. 1 is an isometric view of the modular military vehicle carrying a pair of side, personnel pods and 3 cantilevered cargo pods.

The drawings will be described in greater detail below. Like components will carry the same numerical identification in different drawings and embodiments.

DETAILED DESCRIPTION

The disclosed modular vehicle primarily is designed for military use. For such use, however, the modular vehicle needs to be readily transported by air (e.g., cargo plane, helicopter, etc.) to remote hostile territory; withstand explosive blasts, bullets, and like insults; be easy to maintain and repair; readily convertible for cargo use, troop transport, wounded soldier (ambulance) transport; provide cover and support for ground soldier advancement; and the like. The disclosed modular vehicle accomplishes each of these tasks and more, as the skilled artisan will appreciate based on the present disclosure. Its design flexibility further enables the disclosed modular vehicle to be adapted for passenger use, civilian ambulance use, civilian cargo use, and the like.

Referring initially to FIGS. 1-5, a modular military vehicle, 10, is shown to include a central chassis module or CCM, 12 (see FIG. 18), composed to a driver module, 14, and an engine module, 16. Vehicle 10 also includes two side pods, 18 and 20, and three rear pods, 22, 24, and 26. Equally these three pods could be a single pod across the rear of the vehicle. In these figures, side pods 18 and 20 carry personnel, while rear pods 22, 24, and 26 carry cargo. Vehicle suspension, steering, wheels/tires, transmission, headlights, windows (glass or polymer, often bullet-proof), and the like will be provided in conventional fashion adapted to the intended use of vehicle 10. Driver module 14 and side modules 18 and 20 all are fitted with doors, such as doors, 28 and 30, on side pod 18, and a door, 32, on driver module 14, for ingress and egress of personnel. Driver module 14 is adapted for in-line front-to-back seating of two personnel with the driver entering module 14 through door 32 and the rear personnel entering module 14 via an overhead opening, 34 or through door 32 without the driver in position and the driver seat having the capacity to tilt forward. Access to cargo modules 22, 24, and 26 can be gained by side or rear doors, such as, for example, a side door, 36, for module 22. Desirably, driver module 14 has a rear bulkhead to allow for ease of building the internal elements of the module 14.

Figure 9:
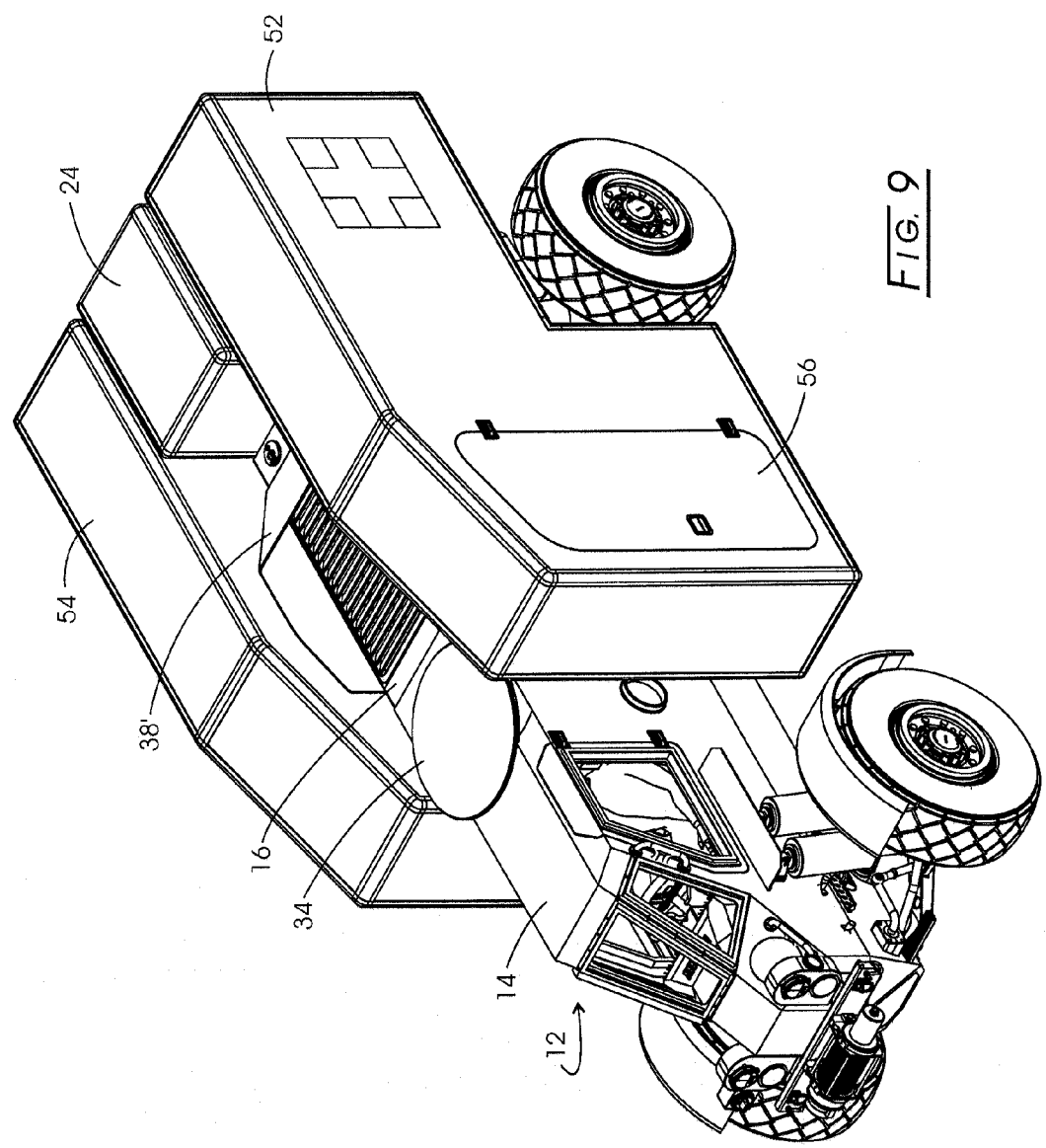
FIG. 9 is an isometric view of the modular military vehicle fitted with ambulance side pods.
Figure 10:
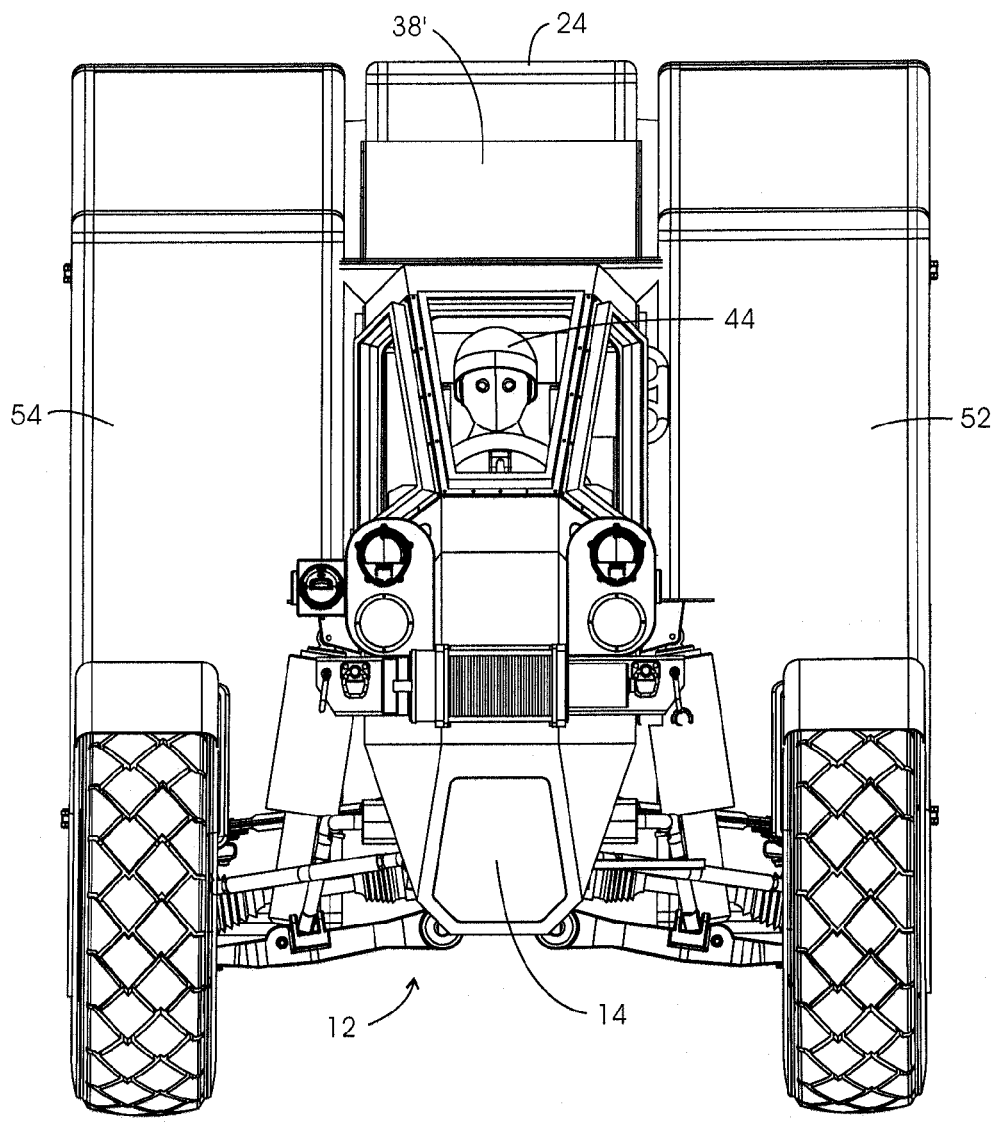
FIG. 10 is a front view of the modular ambulance vehicle of FIG. 9.
Figure 11:
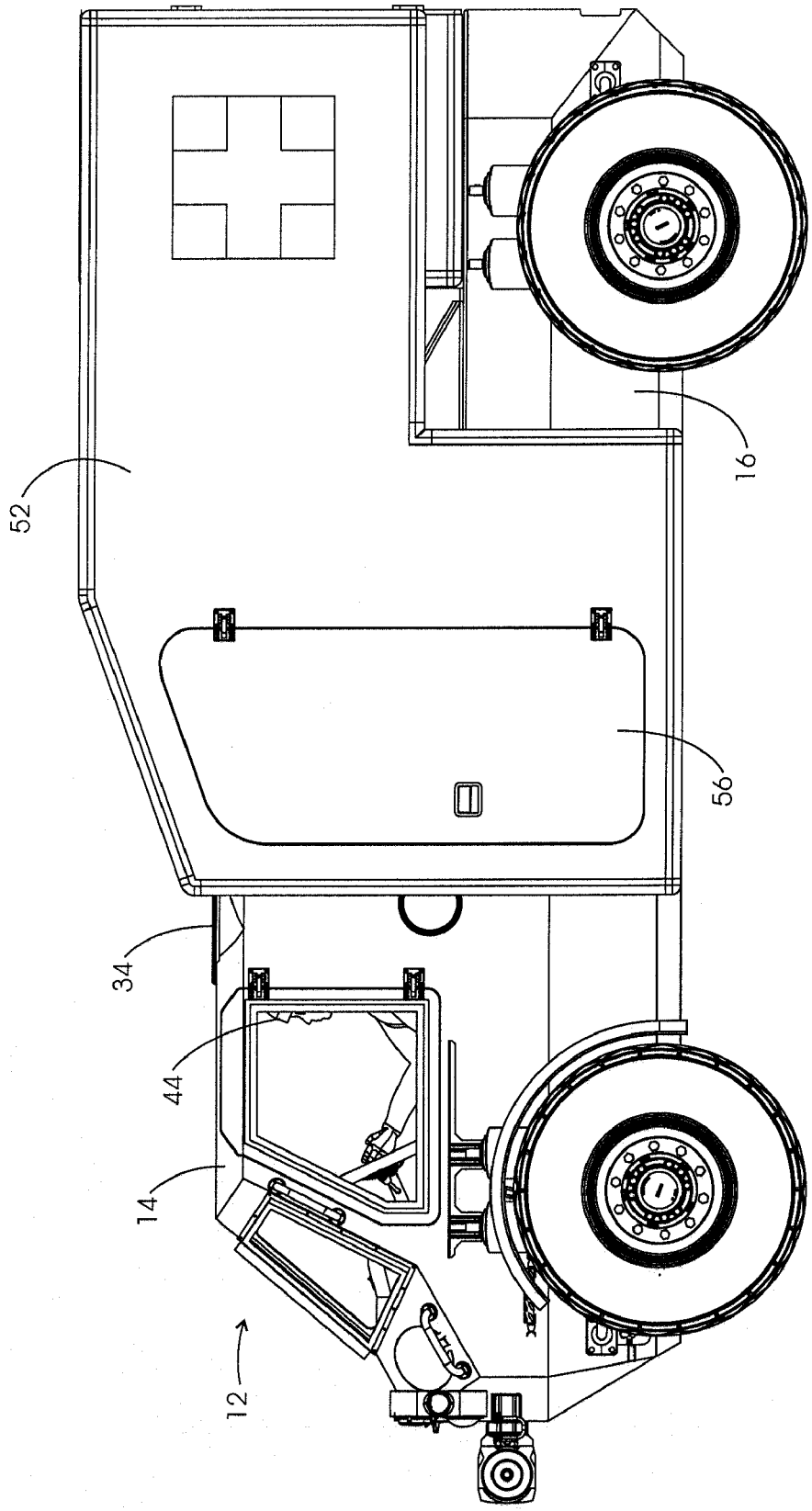
FIG. 11 is a side view of the modular ambulance vehicle of FIG. 9.
Figure 12:
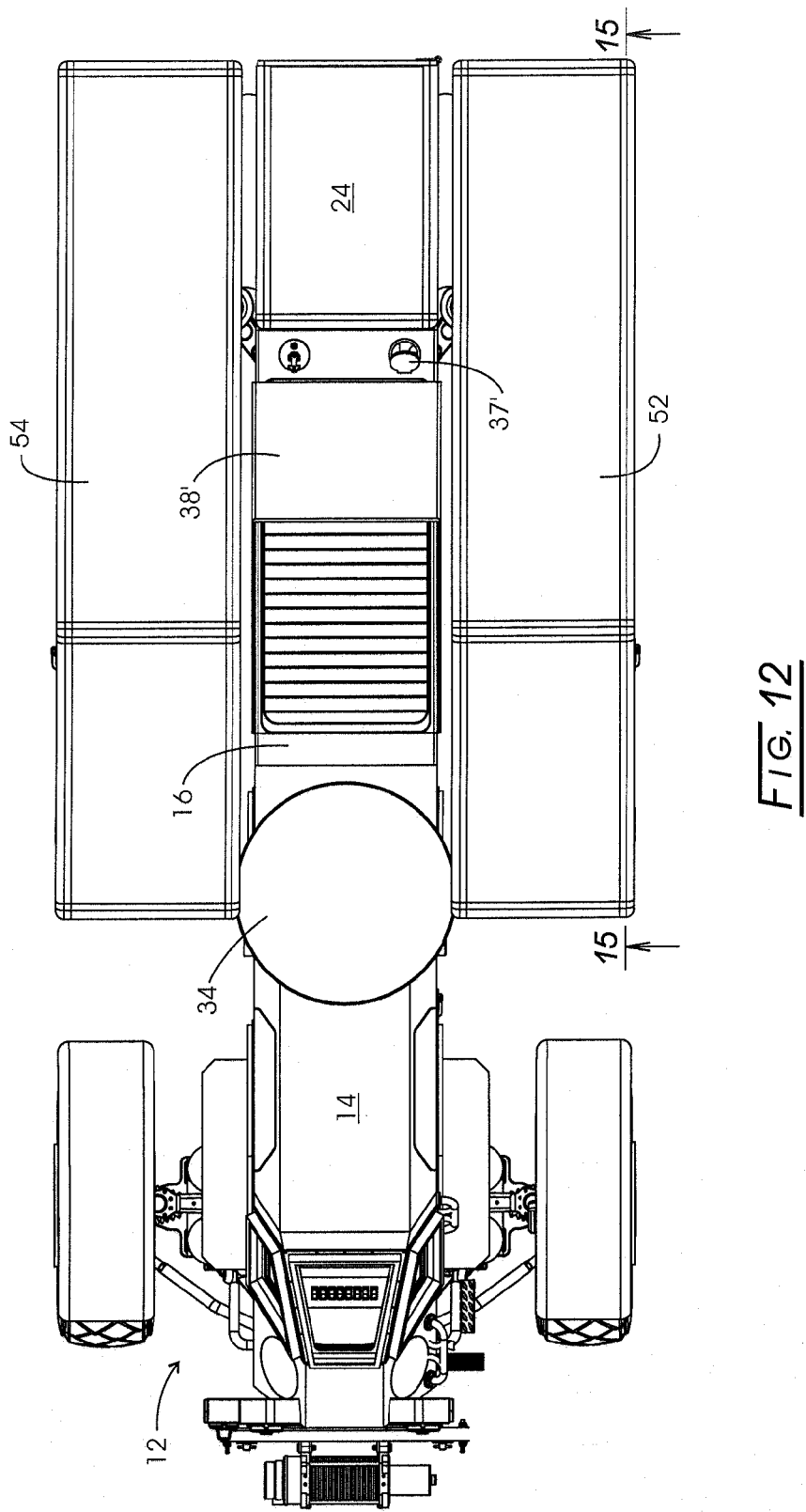
FIG. 12 is a top view of the modular ambulance vehicle of FIG. 9.

A retractable/extendable engine air inlet, 38, is seen in an extended position from the top of engine module 16 (two engine configuration forms shown in FIG. 1 and FIG. 9). Air inlet 38 can be retracted or removed. Its location atop modular vehicle 10 keeps it above much of the dust created by vehicle 10 and events occurring on the ground in the vicinity of vehicle 10. An exhaust port, 37, for the engine exhaust is disposed rearward of air inlet 38 or air can exit down over the engine and exit via holes at the rear of the CCM rear engine module. In one configuration, a grate, 39, allows air to exit the engine compartment. Not only will be air be cleaner atop vehicle 10, but it will be cooler than air next to or underneath vehicle 10 particularly when in a hot environment. Such air inlet and exhaust ports also could be located in the sides of engine module 16 close to the top and these same benefits realized. For present purposes, the air inlet and/or exhaust ports are located "about the top" of the engine module by being located in the top of the module or in a side of the module very close to the top thereof.

Figure 2:
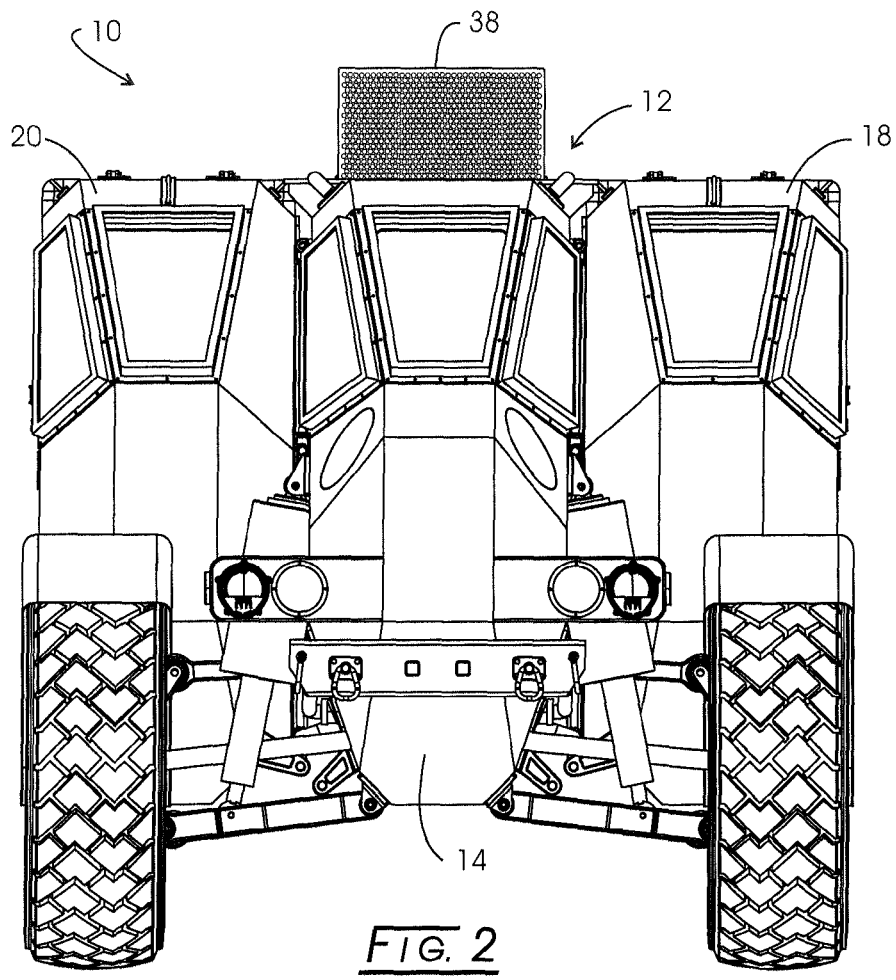
FIG. 2 is a front view of the modular military vehicle of FIG. 1.
Figure 2A:
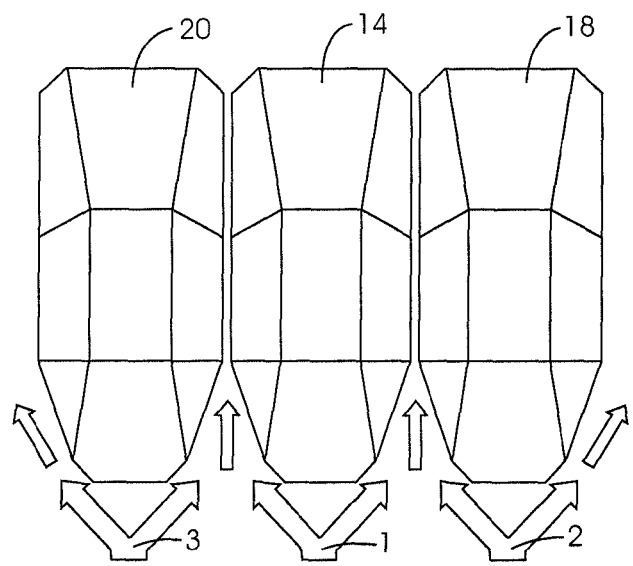
FIG. 2A is a simplified schematic view of the modular military vehicle of FIG. 2 showing the blast energy dissipation paths resulting from the design of the bottoms of the modules.
Figure 3:
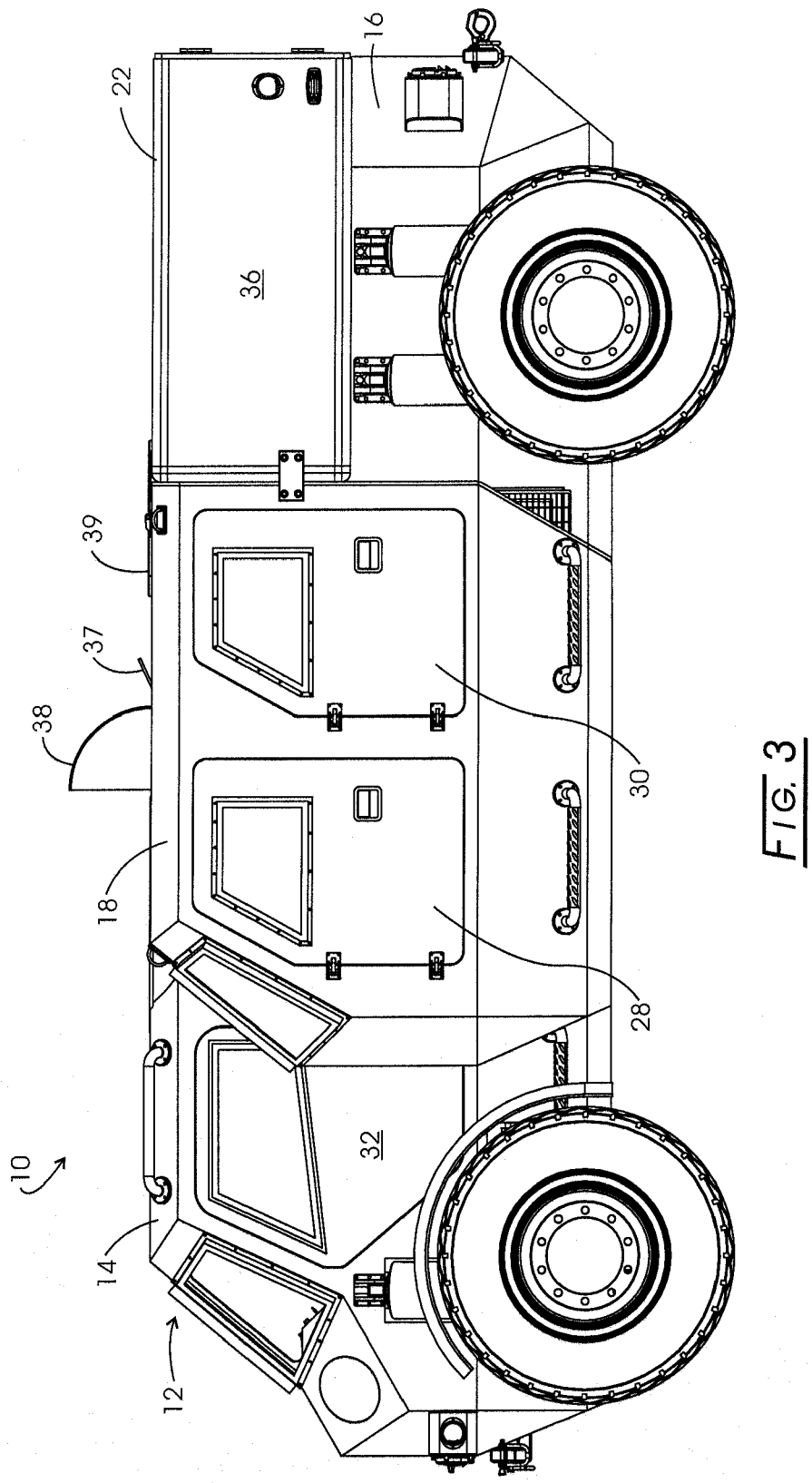
FIG. 3 is a side view of the modular military vehicle of FIG. 1.
Figure 4:
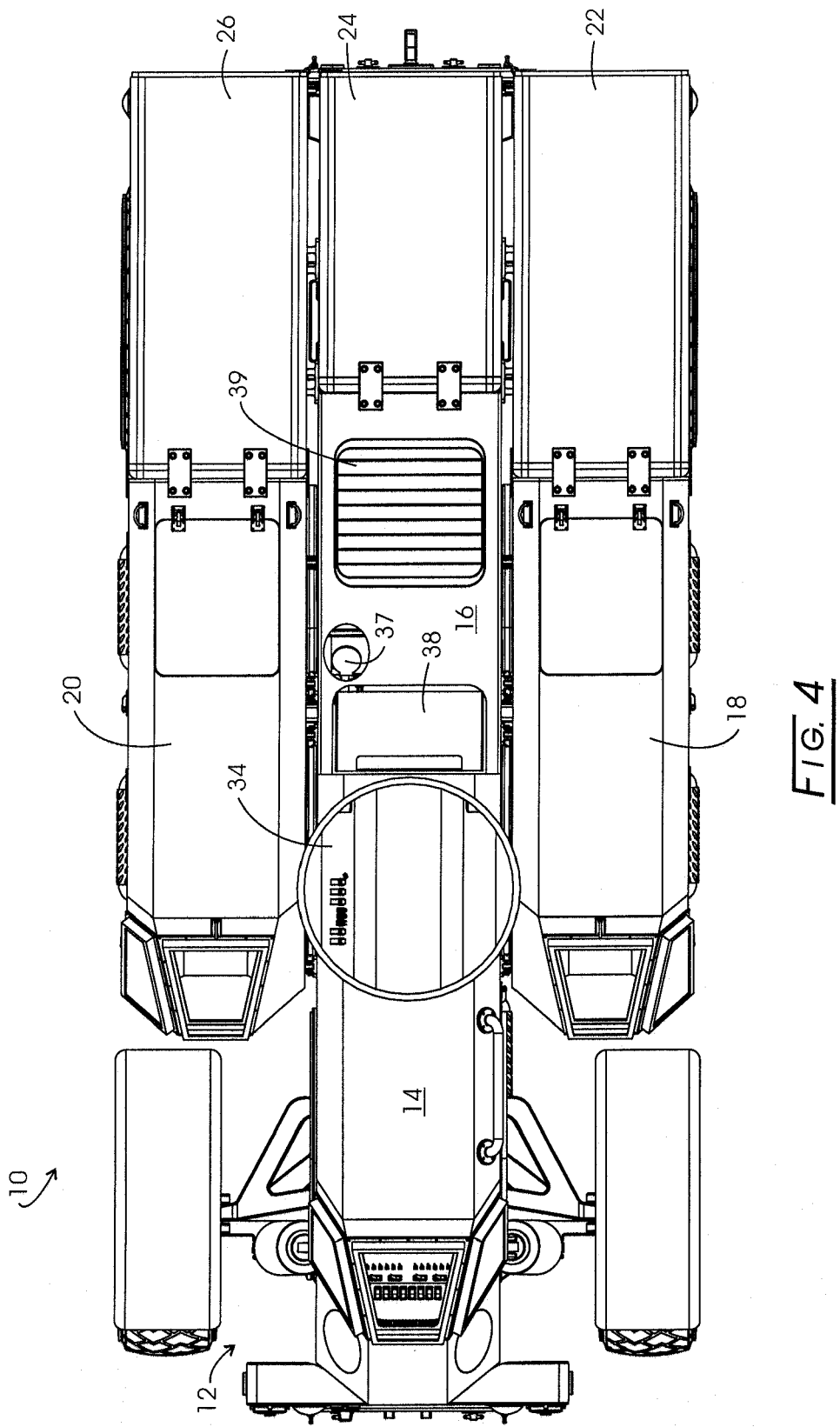
FIG. 4 is an overhead view of the modular military vehicle of FIG. 1.
Figure 5:
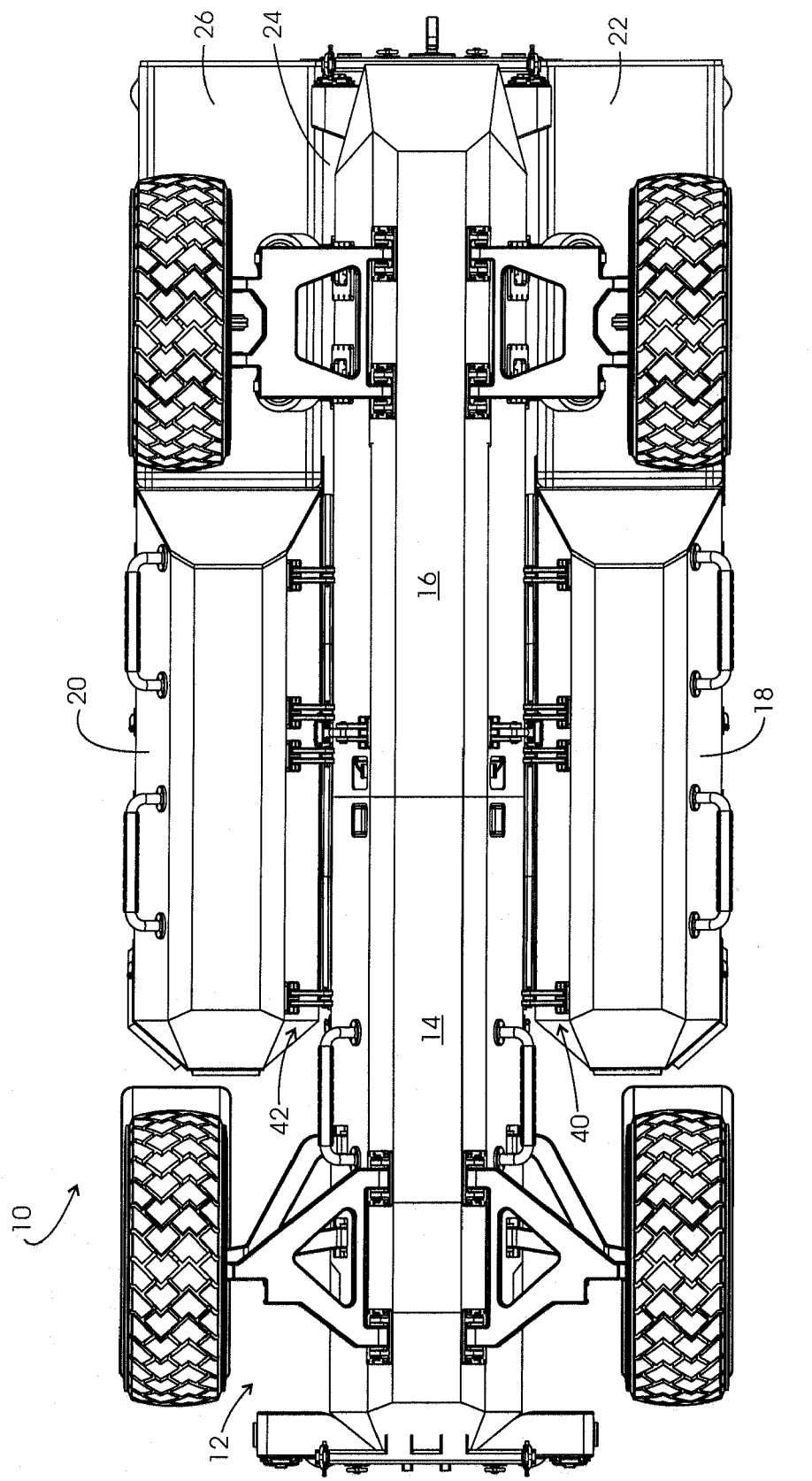
FIG. 5 is an underside view of the modular military vehicle of FIG. 1.

The bottoms of each module can be designed with upward slanting sides to aid in deflecting any blasts occurring from underneath modular military vehicle 10 to minimize damage. A blast energy dissipation pattern, 1, (see FIG. 2A) for driver module 14; a blast energy dissipation pattern, 2, for side module 18; and a blast energy dissipation pattern, 3, for side module 20, show the blast energy being diverted around the sides of the modules to lessen damage to the components of vehicle 10. Such pattern along with side modules 18 and 20 that can be controllably blown away from CCM 12 will help in minimizing vehicle damage from blasts occurring underneath virtually any area beneath vehicle 10.

Figure 6A:
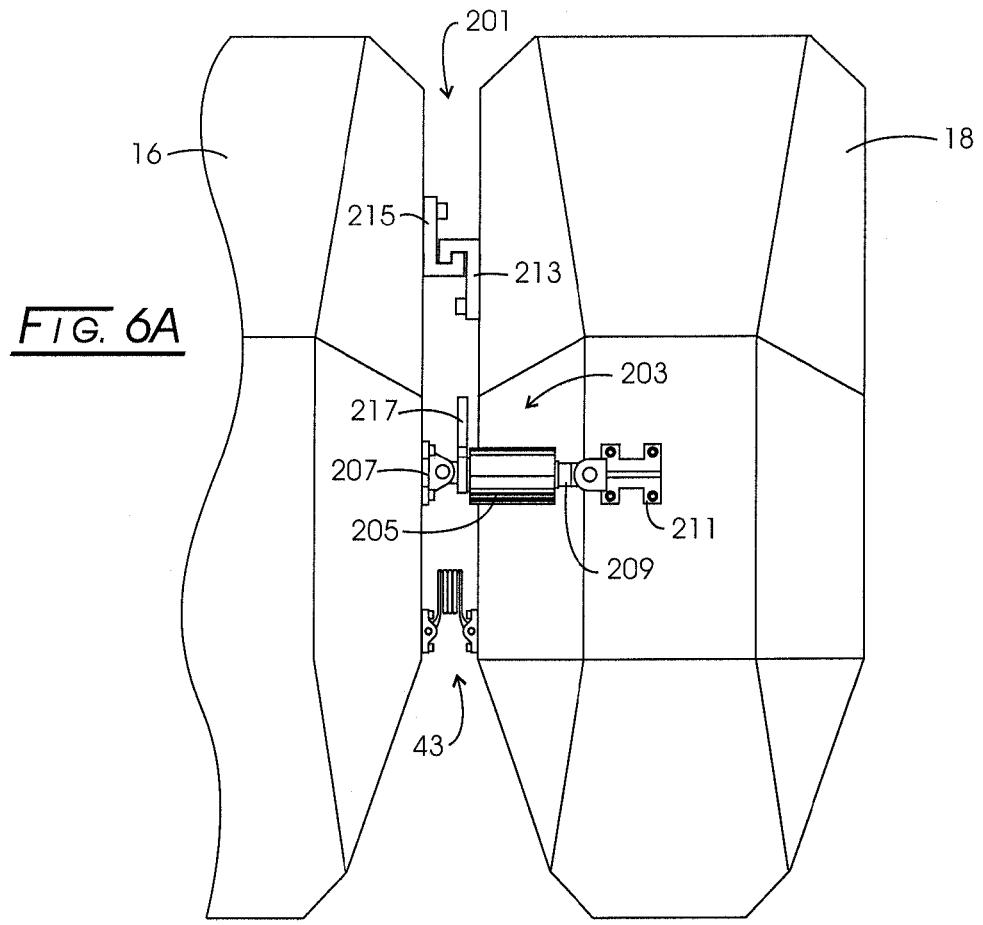
FIG. 6A is an enlarged view of the frangible coupling system of the side pods to the CCM.
Figure 6B:
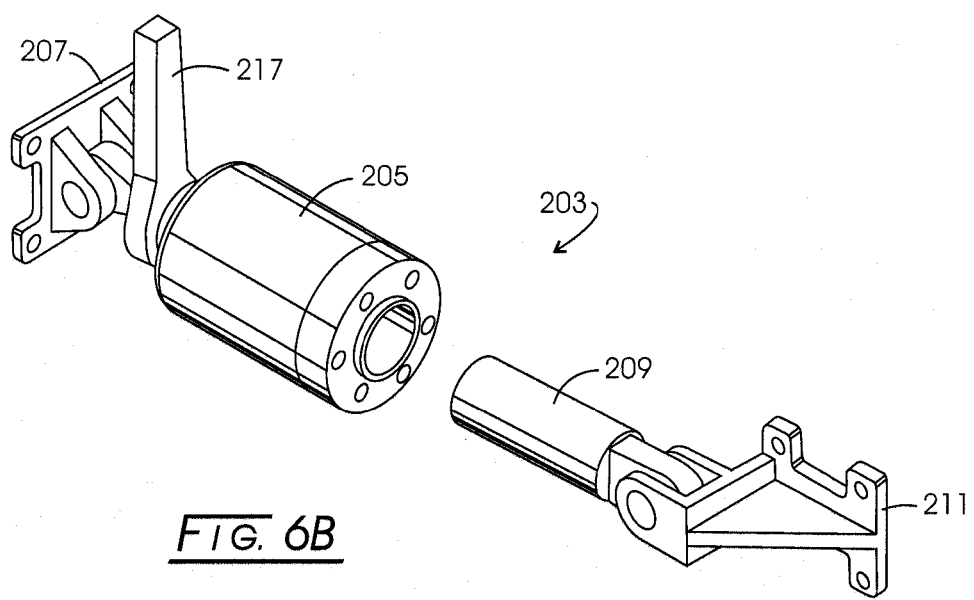
FIG. 6B is an isometric of the shock absorbed element of the frangible coupling system depicted in FIG. 6A.
Figure 7:
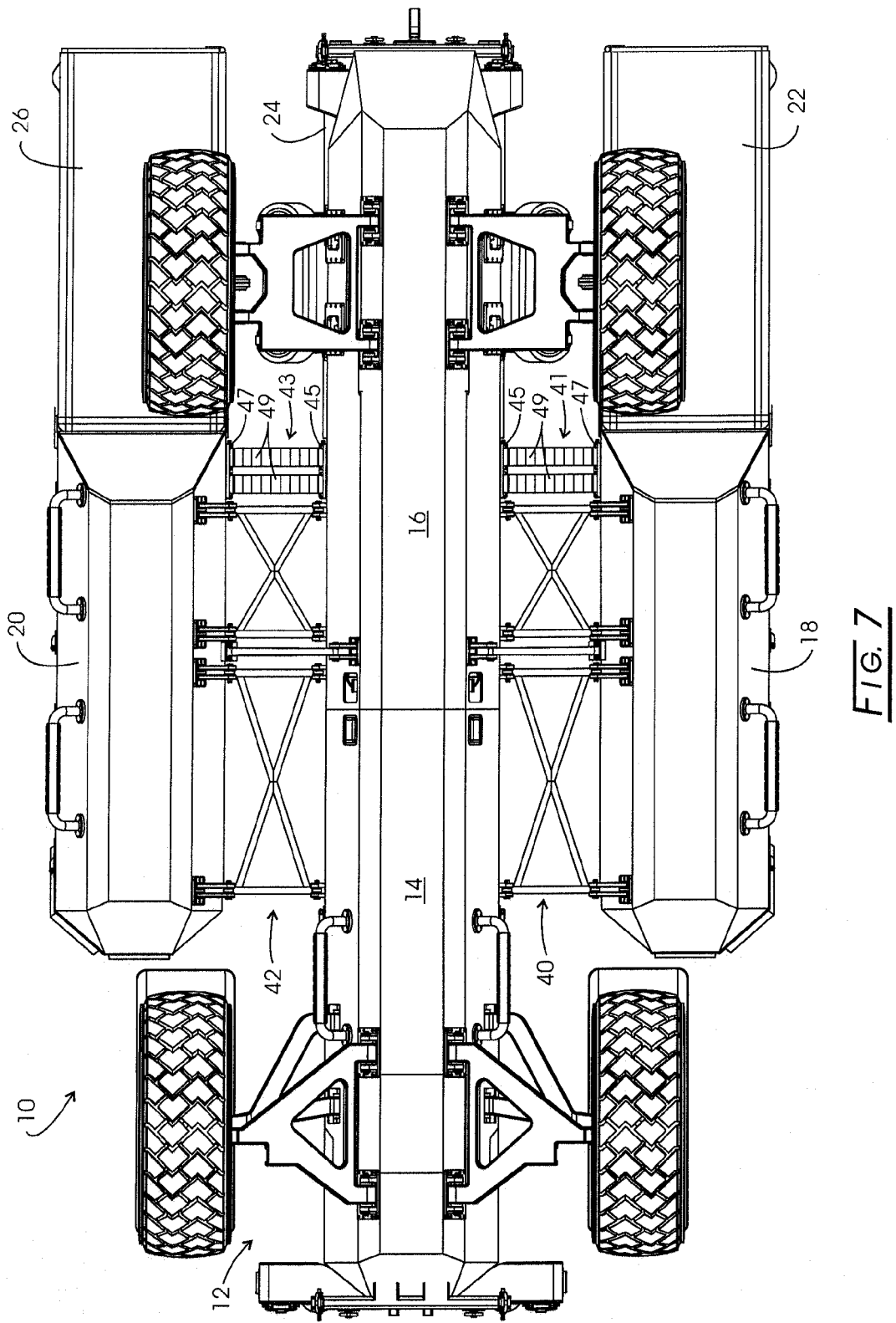
FIG. 7 is an underside view of the pod-deployed vehicle in FIG. 6.

Referring now to FIGS. 6 and 7, side pods 18 and 20 are seen in partially deployed condition up and away from CCM 12 using hydraulic pistons and supporting strut assemblies, 40 and 42, which are conventional in design and operation. Deployment of side pods 18 and 20 enjoys several advantages, including, inter alia, reducing the footprint size subject to road explosions, adding increasing distance from ground blasts, isolating pods subject to damage from blasts and explosions, and providing foot soldier protection between the side pods and CCM 12 (potentially with platforms that deploy for the soldiers to stand on upon deployment of the side pods). The blast deflecting bottom design also is seen to include a small horizontal flat or V bottom with angled flat sections that extend upwards. Such design presents a minimal footprint to explosions. The slanted sections and space created between the deployed side pods and CCM 12 deflect the brunt of the explosive force upwards away from the vehicle to minimize damage. The modular design permits any damaged pod to be readily replaced in the field and the vehicle put back in operation.

It should be observed that the hydraulic system for deploying the side pods or modules also could be adapted to move the side pods from an operating position adjacent to the CCM to the ground for removing the side pods and from the ground to an operating position. Thus, the hydraulic system could be adapted for putting on and taking off the side pods from the DMACS.

In the event of an explosion, the troop side pod coupling to the central element is "frangible", permitting the side pod to be dislodged by the explosion. It is thought that, to absorb some of the energy of the blast explosion, it is possible that a damper can be placed between the side pod and the CCM as part of the frangible system. The addition of this dampening mechanism may allow the pod to still remain attached to the CCM without breaking the frangible coupling.

With reference to FIGS. 6A, 6B, and 7, side module 18 is illustrated affixed to engine module 16 using an interlocking bracket assembly, 201, a cylinder assembly, 203, and a tether assembly, 43. Together, these items make up the frangible coupling of the central element to the side module. Interlocking bracket assembly 201 is composed of a pair of "L" brackets, 213 and 215, which are retained in interlocked relationship by gravity. Additionally, attenuating assembly 203 (such as a cylinder assembly) is composed of a cylinder, 205, associated bracket, 207, a handle, 213, and interfitting rod, 209, and associated bracket, 211. Hooking a side module to the CCM is quick and easy by dint of the design of the frangible coupling assembly. Handle 213 is rotatable to cause pressure from cylinder 205 to be exerted on inserted rod 209. This ensures that the side module will stay attached during travel, such as, for example, over rough roads. The force of a blast, however, will cause rod 209 to withdraw from cylinder 205 and the tethers will limit the distance of travel of the dislodged module.

The troop side pod also can be retained to the CCM by means of tether assemblies (see also FIGS. 7A and 7B), 41 and 43, whose ends are retained on both the CCM and the side pod by brackets, 45 and 47. The straps, 49, most likely will be in the form of webbing having a degree of elasticity and stitched together in a snaked or accordion pattern so that when the pod moves away from the CCM the stitching is broken as the tether unfolds.

Figure 7A:
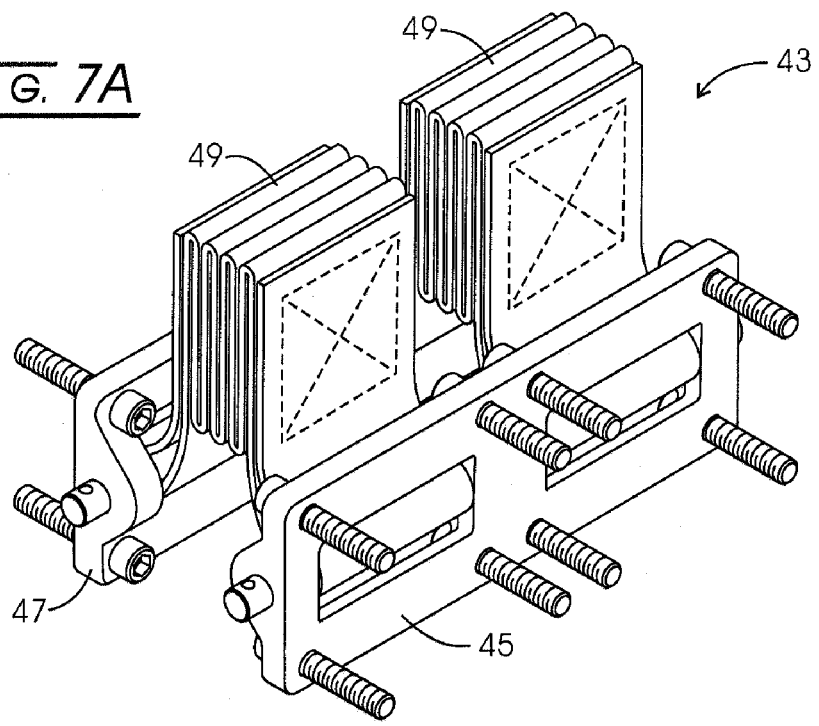
FIG. 7A is an isometric view of one of the tether assemblies seen in FIG. 7.
Figure 7B:
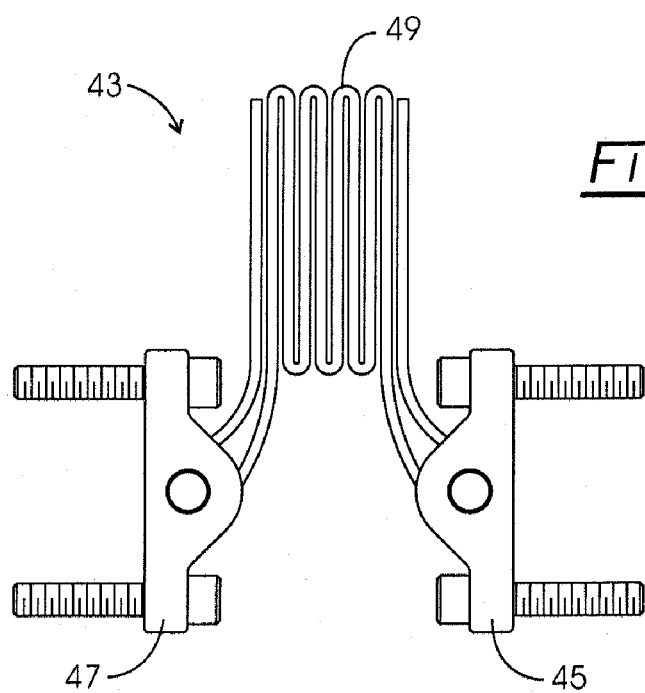
FIG. 7B is a side view of the tether assembly shown in FIG. 7B.

The frangible coupling assembly and tether, then, are able to further absorb some of the explosion energy during an explosion, say, beneath the vehicle. In particular, the cylinder assembly pulls apart with some force as is typical for a cylinder and rod assembly, and by the ether stretching in much the same way that seat belts absorb energy during an accident. Here, however, in order for the pods not to decelerate too violently at the end of the straps, most likely some elasticity will be incorporated into the straps. As shown in FIGS. 7, 7A, and 7B, at least one pair of straps (for example, 3 pairs per side module) can used for each side pod. This number is arbitrary and could be greater or lesser in number.

Figure 8:
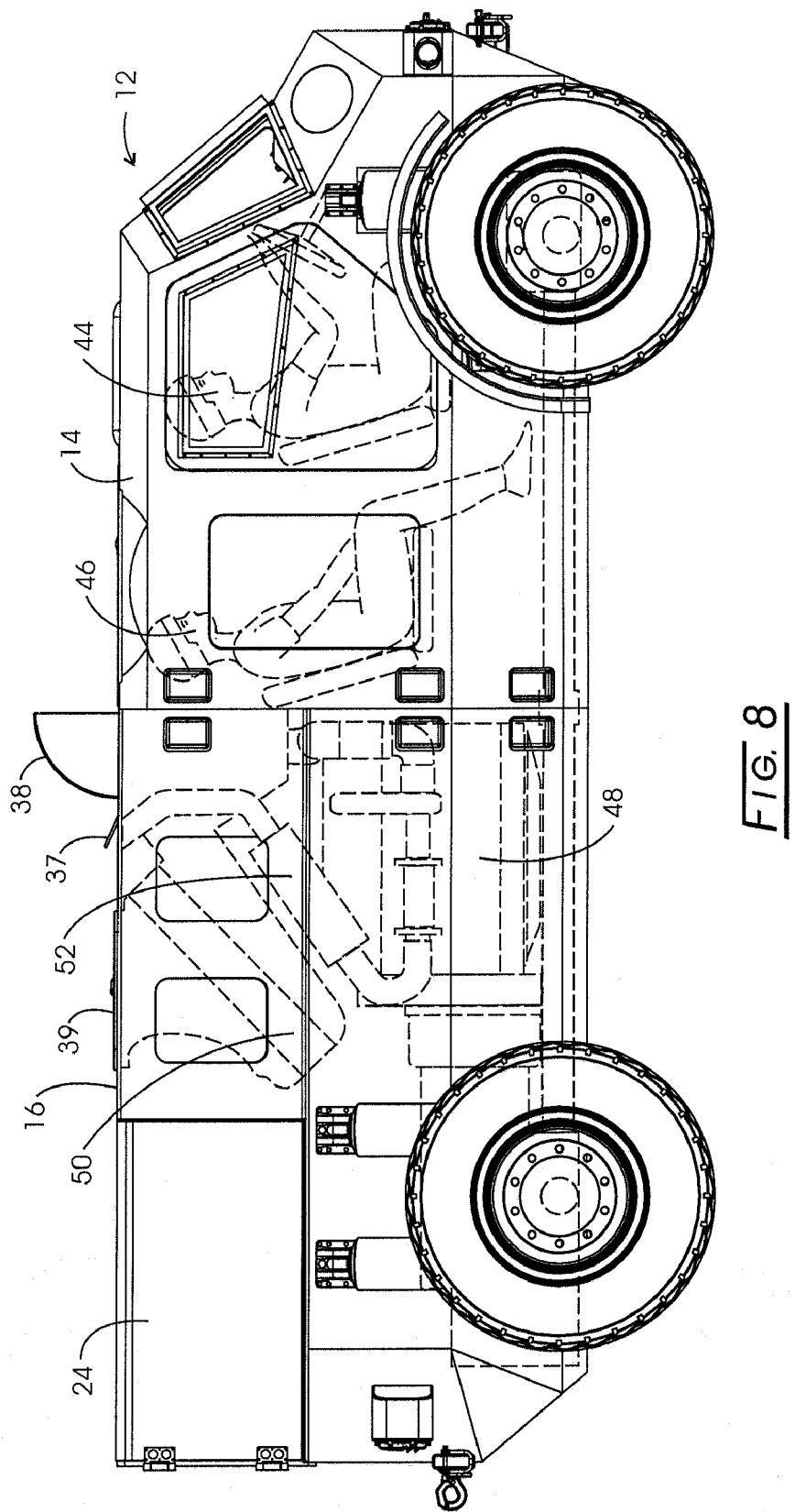
FIG. 8 is a side view of the modular military vehicle of FIG. 1 showing seated personnel, engine, and the like in phantom.
Figure 14:
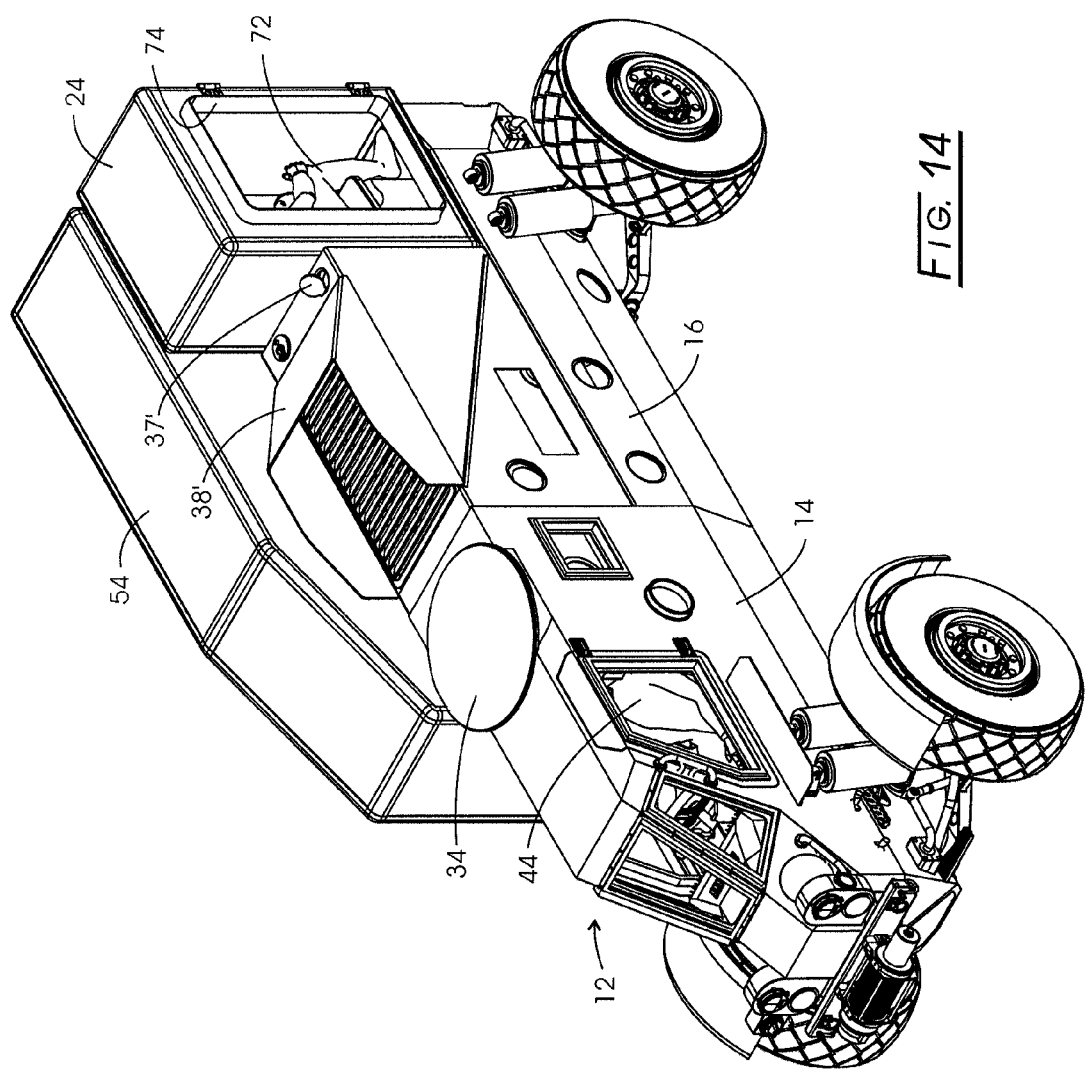
FIG. 14 is an isometric view of the modular military vehicle with only 1 side pod, but with a rear personnel pod.

Personnel, 44 and 46, seated in driver module 14 are seen in FIG. 8. Also seen is an engine, 48, a radiator, 50, and a exhaust assembly, 52. Air for engine 48 and to cool radiator 50 is admitted through grate 38. Exhaust passed through exhaust assembly 52 passes to the atmosphere through port 37. Fresh air for personnel 44 and 46 is admitted via air inlets 38 on each side of the CCM above the engine (FIG. 14 rectangular hole above engine module 16). As observed earlier, locating the air inlets and exhaust atop vehicle 10 will minimize dust entry into vehicle 10. A presently preferred engine/radiator configuration, however, is illustrated in FIG. 14.

Figure 13:
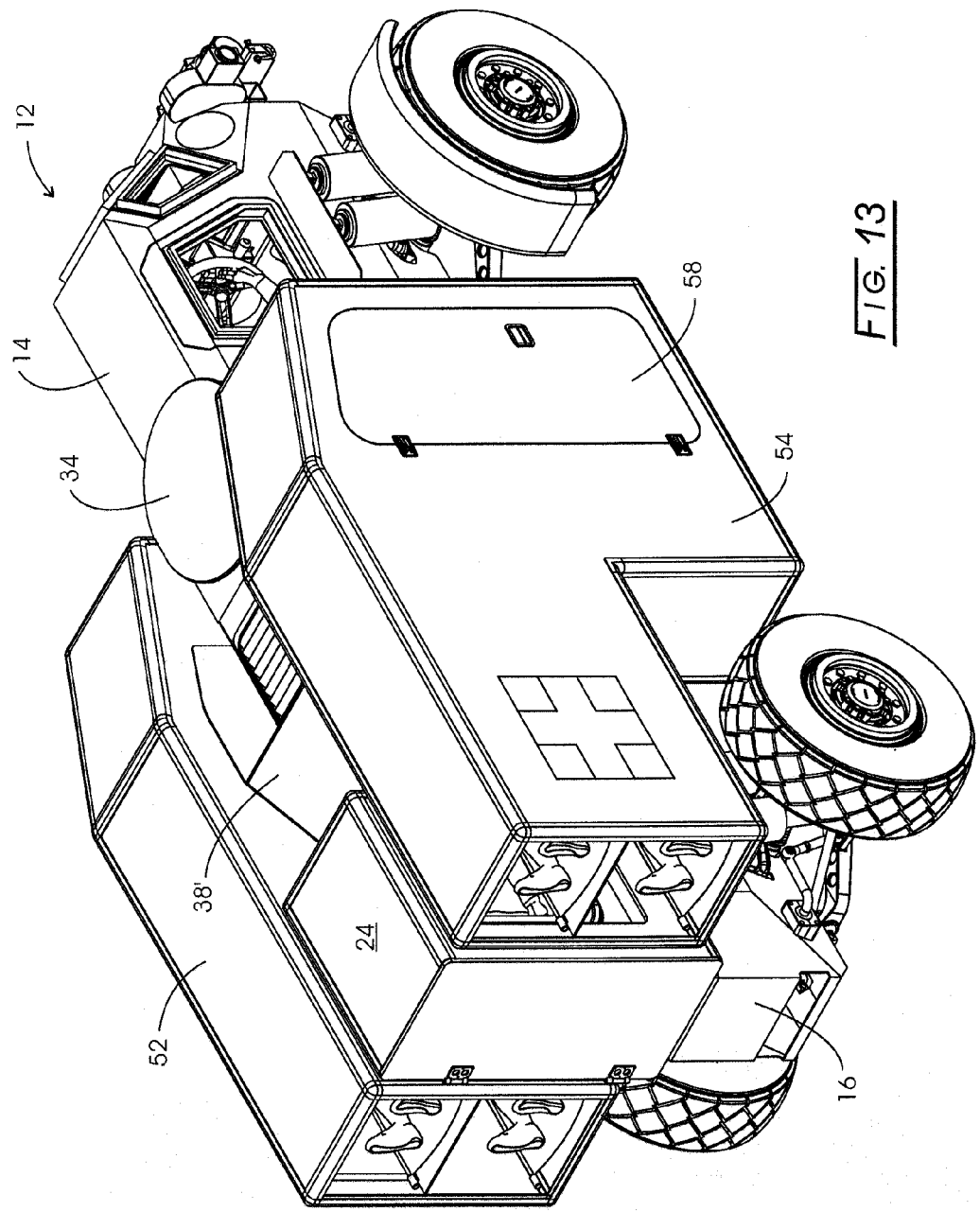
FIG. 13 is a rear isometric view of the modular ambulance vehicle of FIG. 9.
Figure 15:
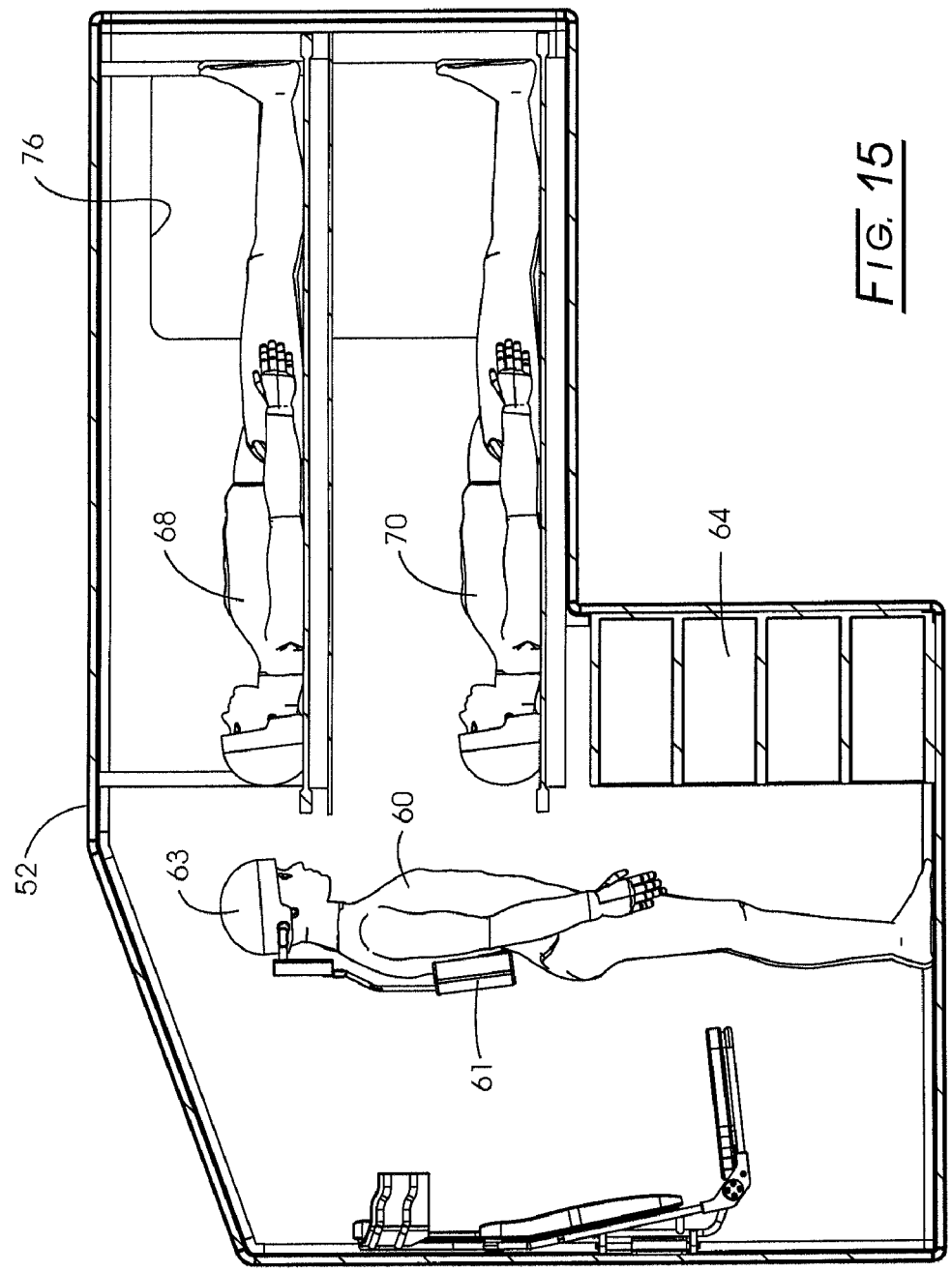
FIG. 15 is a sectional view taken along line 15-15 of FIG. 12.
Figure 16:
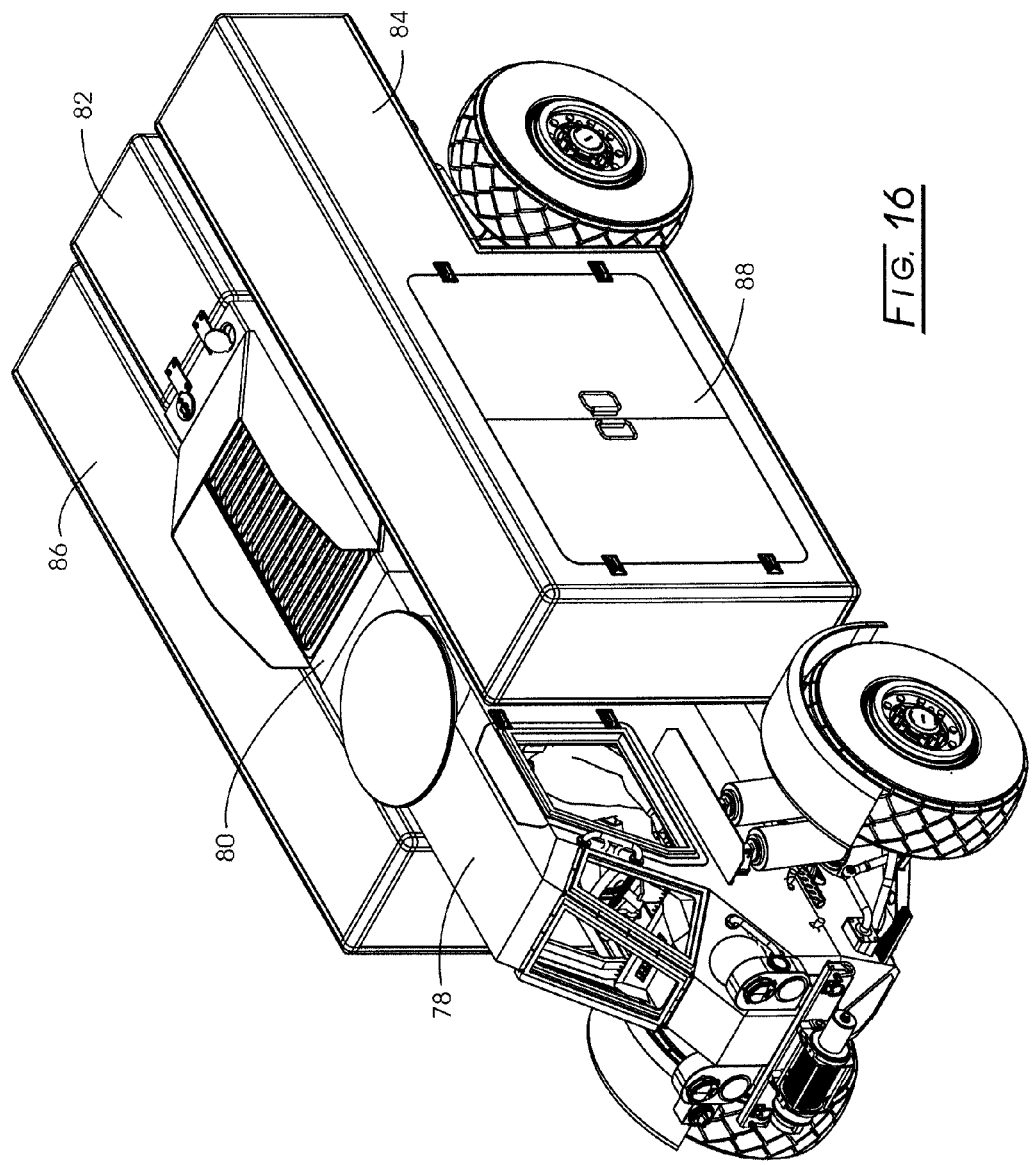
FIG. 16 is an isometric view of the modular military vehicle fitted with cargo side pods.
Figure 17:
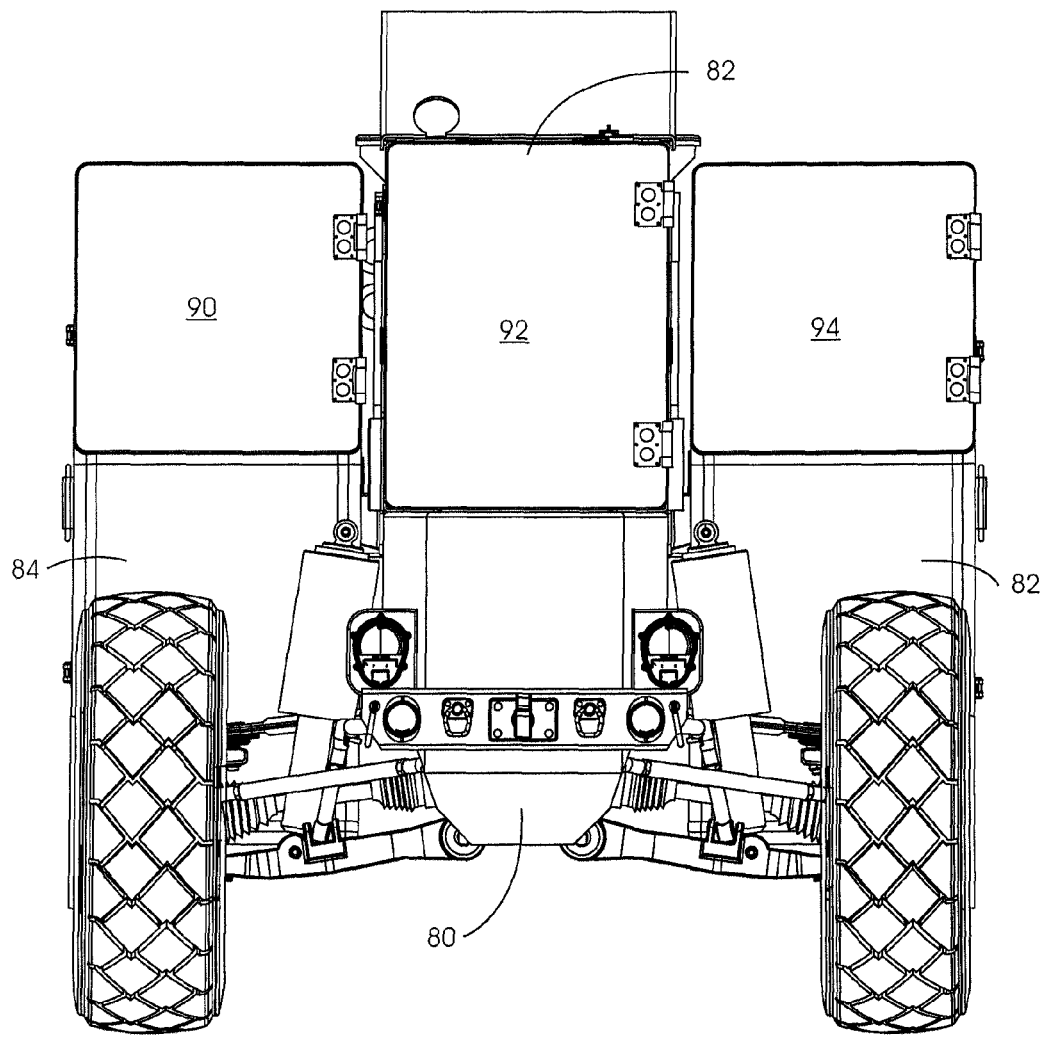
FIG. 17 is a rear view of the modular cargo vehicle of FIG. 16.

In FIGS. 9-13, litter pods, 52 and 54, have been attached to CCM 12 to create a modular ambulance. CCM 12 remains unchanged from the previous drawings, except for an air intake, 38', and exhaust, 37'. Litter pods 52 and 54 may or may not be deployable. Litter pod 52 is fitted with a door, 56, while litter pod 54 also is fitted with a door, 58 (see FIG. 13). Medic personnel can enter litter pods 52 and 54 through doors 56 and 58. Wounded soldiers can be placed in litter pods 52 and 54 conveniently through rear access openings in litter pods 52 and 54, such as is illustrated in FIG. 13. Doors, netting, or other restrictions will be provided to keep the litters in litter pods 52 and 54. In FIG. 15, a medic, 60, is seen in medic pod 52 where he can attend to the needs of wounded soldiers on litters, 68 and 70, or can be seated on a seat, 62. A storage bin, 64, is provided to house medicines, instruments, and like items.

Medic 60 is fitted a SAPI panel, 61, affixed to his helmet, 63. Personnel 44 and 46 seated in driver module 14 also could be fitted with a SAPI panel, as, indeed, could any personnel confined within military module vehicle 10. FIGS. 28-31 illustrate medic 60 again, standing and sitting. SAPI panel 61 is seen affixed to helmet 63 in addition to medic 60, regardless of whether in a seated or standing position. Such extended panel 61 from the SAPI pack will be secured with, for example, Velcro® into position within the soldier's ballistic vest and with the soldiers' ballistic collar. It is thought that a pivot at the top of this extended SAPI panel should be incorporated to allow the head to be turned easily and with comfort.

Since the narrow aspect of litter pods 52 and 54 permit medic to easily only treat the upper torso and head of the wounded soldier, module 24 is a personnel module for carrying an additional medic, 72, which can treat the legs and lower torso of the wounded soldiers. In order to accomplish such treatment, an access, 74, is created in module 24 that mates with a similar access, 76, in module 52. Similar accesses are provided for medic 72 to treat wounded soldiers in module 54.

Figure 18:
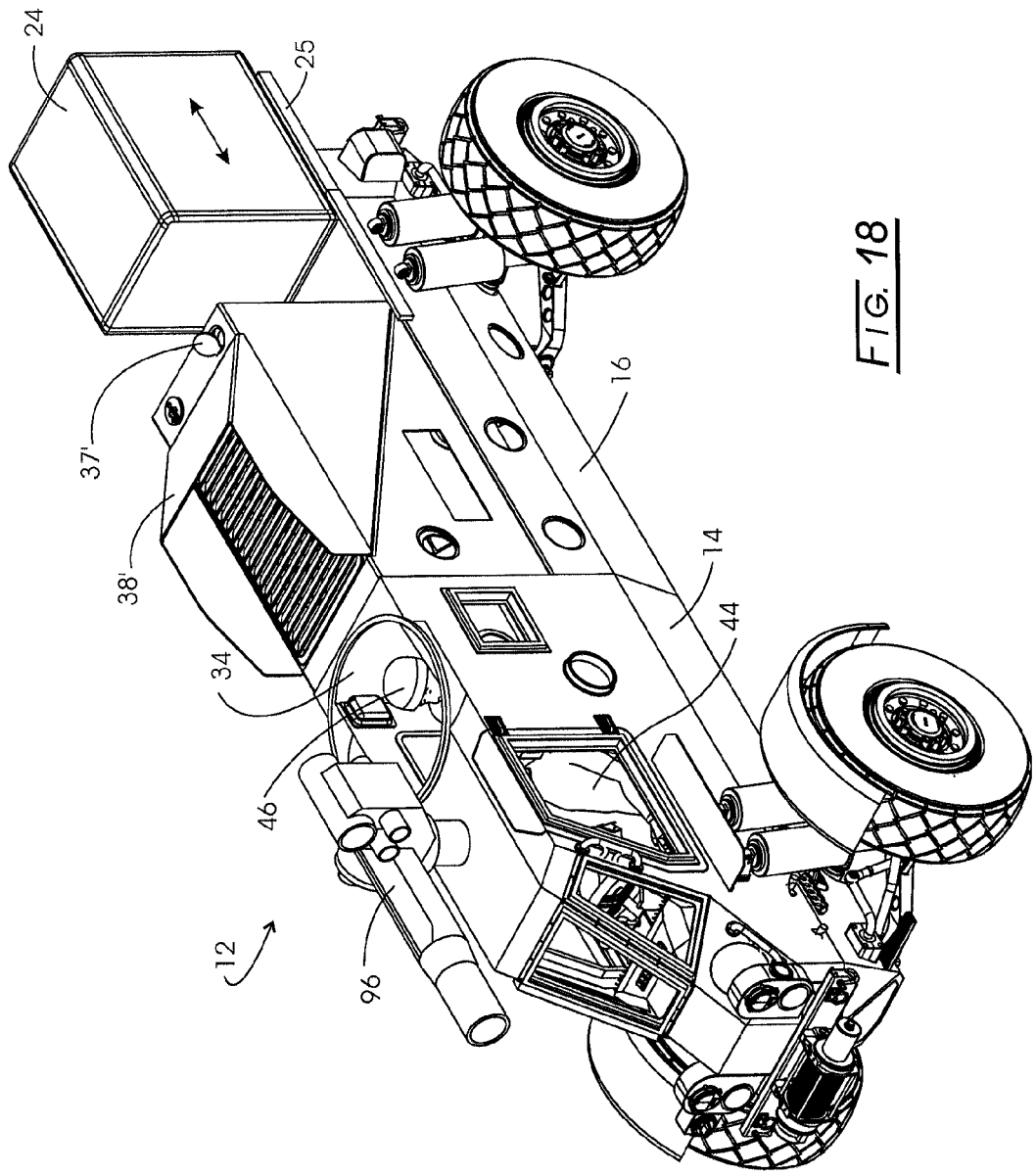
FIG. 18 is an isometric view of the modular military vehicle without side pods, but fitted with top-mounted armament and a movable rear storage module.

CCM 12 is illustrated in FIG. 18. In this embodiment a portable missile launcher, 96, is disposed atop driver module 14 and is desirably controlled by personnel 46, so that driver 44 can concentrate on driving CCM 12. Module 24 is mounted on rails, such as a rail, 25, and another rail on the far side of CCM 12 that is not seen in FIG. 18. Moving module 24 rearwardly away from CCM 12 also permits repair/maintenance access to the engine in engine module 16 and to the transmission and other drive train elements disposed therein. A cover conveniently at the rear of CCM 12, for example, could be opened to provide such servicing access.

That CCM 12 can be operated as a stand-alone vehicle is an advantage of the design disclosed herein. For that reason, CCM 12 and all disclosed modules can be manufactured from aluminum or composite material for weight reduction. Also, a layer "up armor" can be provided as a ballistic layer from a variety of composite materials presently used to shield military vehicles. When the side modules/pods are attached, they provide additional shielding for CCM 12 and drive components from being struck by ballistic impact.

Virtually all surfaces of all modules are designed to be manufactured from relatively flat, planar material (stressed skin), which contributes to reduced manufacturing costs. From the front, a narrow profile is presented, thus reducing the area vulnerable to being struck by bullets, shrapnel, or the like. Aligning personnel in a single row permits such narrow front profile. Similarly having each occupant in a narrow pod allows the effective use of side curtain and front air bags deployed in the event of a blast or accident. Basically being able to encase the occupants between inflated air bags and the seat should increase their likelihood of survival during a blast or accident. It is likely that to save weight, since the crew side pods are not required to carry any vehicle loads, their weight can be reduced allowing additional vehicle payload capacity.

Engine 48 can be any internal combustion engine powered by gasoline, diesel fuel, or the like, optionally turbocharged or supercharged; or can be a turbine engine; or any other power plant designed to propel vehicle 10. While the suspension is conventional for this type of vehicle, independent suspension is advantageous. Sufficient room underneath the driver module permits a driveshaft to pass there beneath to provide 4-wheel or all-wheel drive for vehicle 10. It is possible that the vehicle also could incorporate an alternative drive system like electric or hydraulic.

FIG. 19 illustrates a mobile missile launcher version, 100, of the deformable modular armored combat vehicle disclosed herein. In particular, a pair of side missile pods, 102 and 104, is affixed on either side of a CCM, 106. Personnel located within CCM 106 can control missile launch and target, or the target can be fed into an onboard computer remotely, say, for example, from air or ground reconnaissance. A rear storage module, 108, can convey spare missiles, for example or additional armament, such as, for example, an air-to-ground or air-to-air, or anti-tank, etc., missile. Armament, such as missiles, may require elevation to clear the CCM during firing.

FIG. 20 shows an additional side pod, 110, for transforming the modular combat vehicle into a mobile generator unit, conveying fuel drums, 112, 114, and 116; along with generators, 118 and 120. One or two such mobile generator side pods enable power to be brought into remote field or other locations.

FIG. 21 shows another cargo side pod, 121. One or two of such side pods can be carried by the CCM. Again, the user can use almost any combination of pods on the CCM for extreme flexibility and utility.

Figure 22:
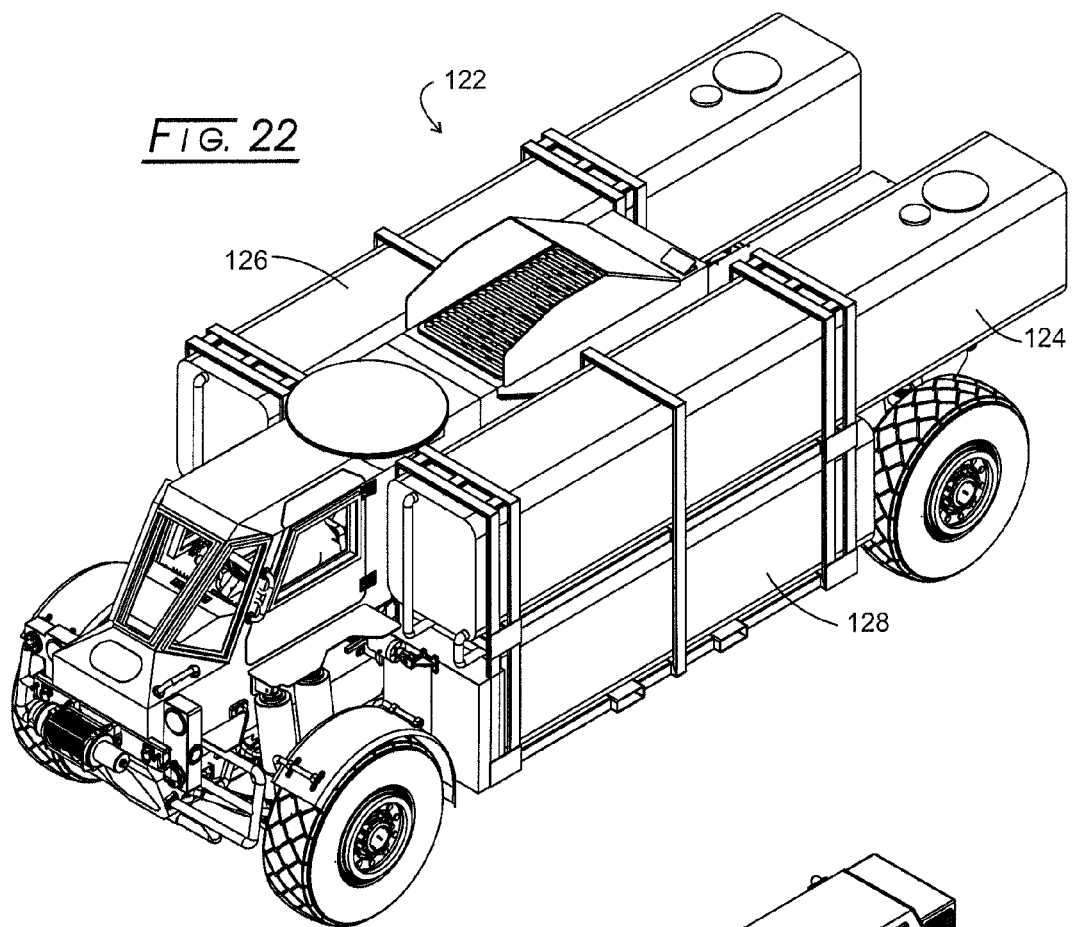
FIG. 22 is an isometric side view of the modular military vehicle adapted as a fuel tanker by configuring with side and rear fuel tanks.

FIG. 22 illustrates a fuel tanker, 122, where fuel tanks are the side pods. In particular, upper side pods, 124 and 126, have upper rear access for fuel. A pair of lower fuel pods, 128 and 130 (not seen), can be in fuel connection with upper fuel pods 124 and 126, or separately accessible.

Figure 23:
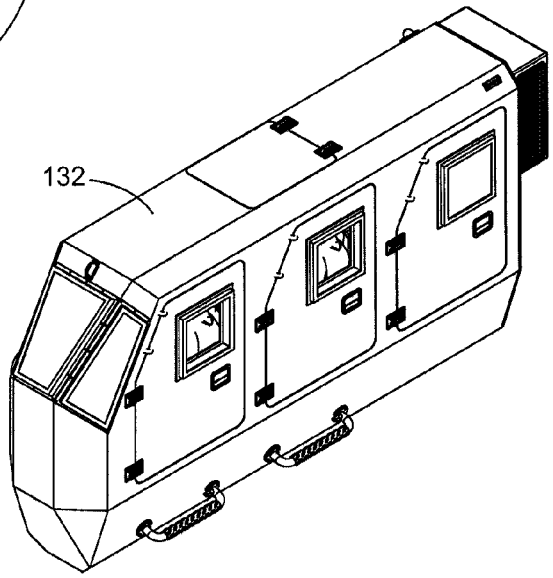
FIG. 23 is an isometric view of a side pod configured to convey 3 soldiers.

FIG. 23 illustrates yet another troop side pod, 132, for conveying 3 soldiers per side pod. Again, one or both side pods could be the 3-troop versions.

Figure 24:
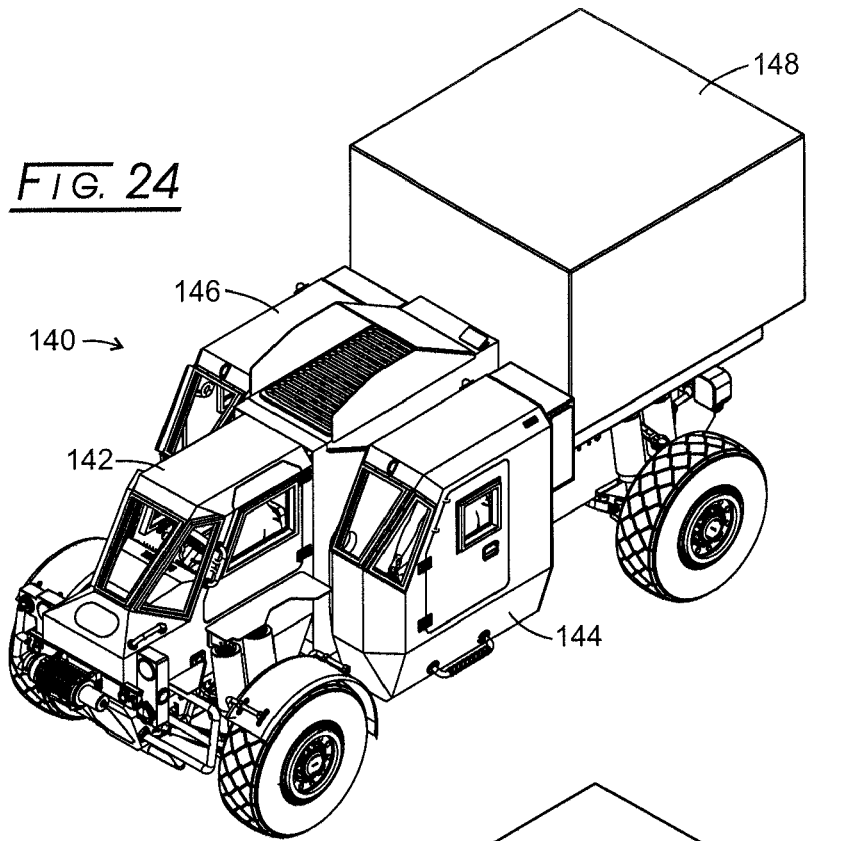
FIG. 24 is an isometric view of the short wheelbase modular military vehicle with a pair of single soldier side pods, a single drive CCM module and a rear shelter.
Figure 25:
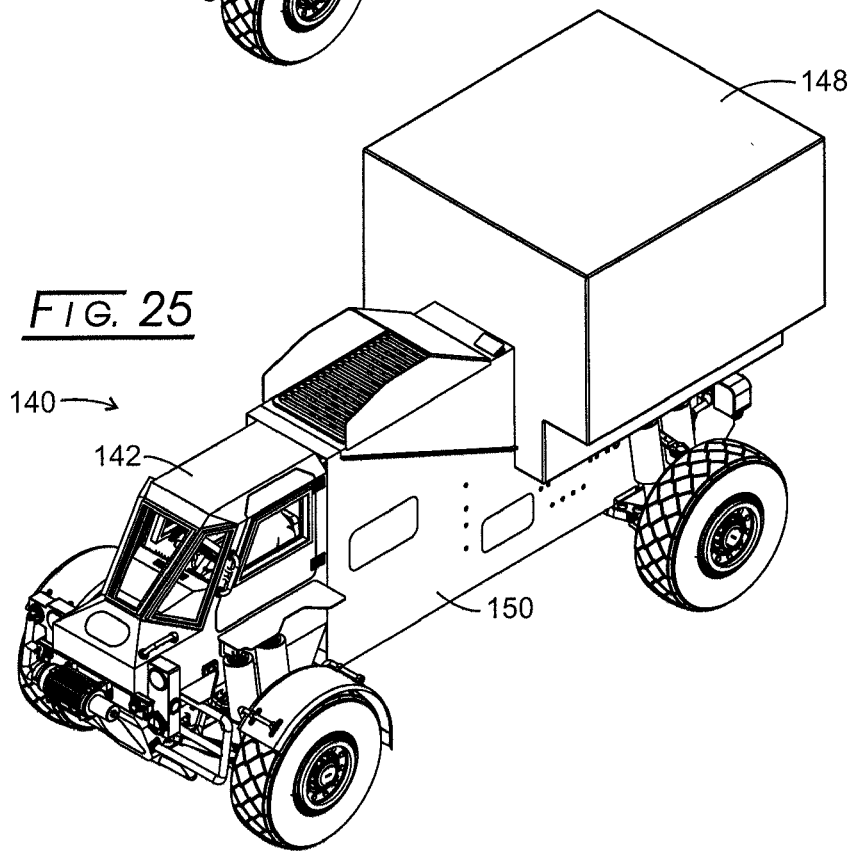
FIG. 25 is the short wheelbase shelter modular military vehicle of FIG. 24 with no soldier side pods.

FIG. 24 illustrates a military vehicle, 140, configured with a short wheelbase, so as to accommodate only a single soldier (driver) in a CCM, 142. Side pods, 144 and 146, carry but a single soldier. Military vehicle 140, then, carries only 3 soldiers. At the rear, is a shelter, 148, for transport into the field (e.g., combat zone). FIG. 25 illustrates vehicle 140 without side pods. An engine module, 150, is revealed in greater detail.

Figure 26:
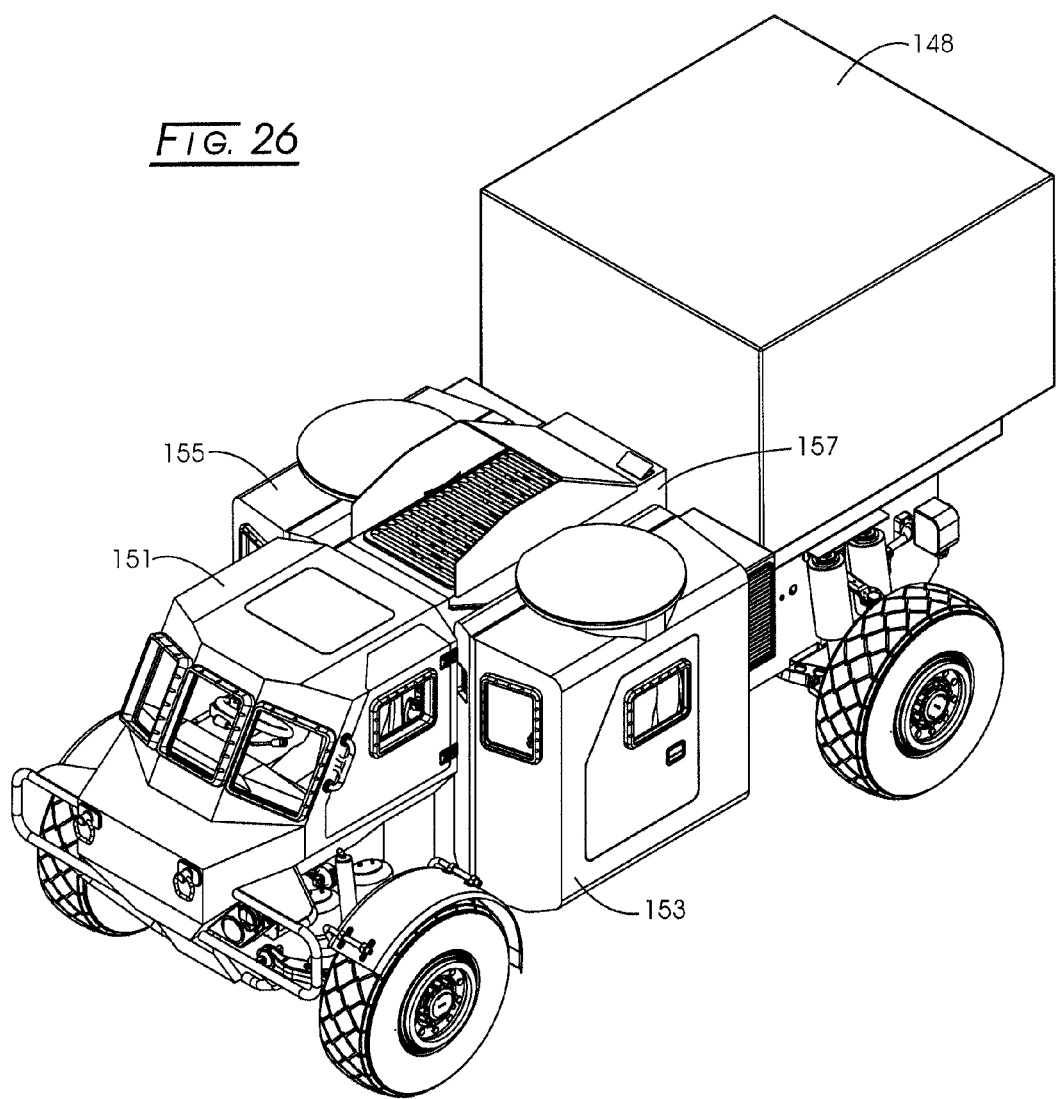
FIG. 26 is an isometric view of another modular military vehicle embodiment having a one-person driver module, side pods for soldiers, and a rear cargo shelter.

FIG. 26 illustrates a military vehicle having a driver module, 151, seating only the driver. A pair of side modules, 153 and 155, are attached to an engine module, 157. Shelter 148 is carried at the rear of the vehicle.

Figure 27:
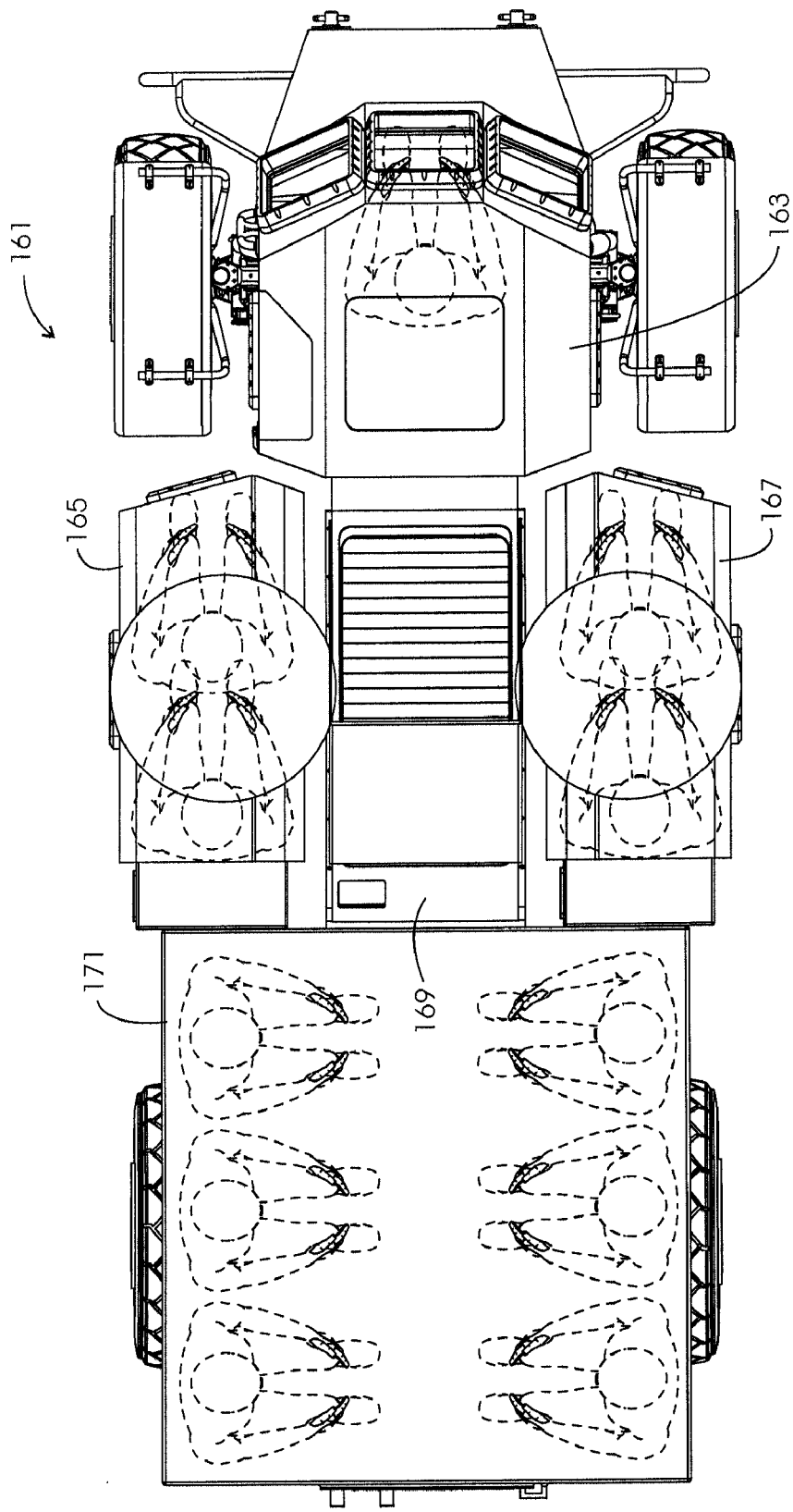
FIG. 27 is an overhead view of another modular military vehicle embodiment designed only for troop transport.
Figure 28:
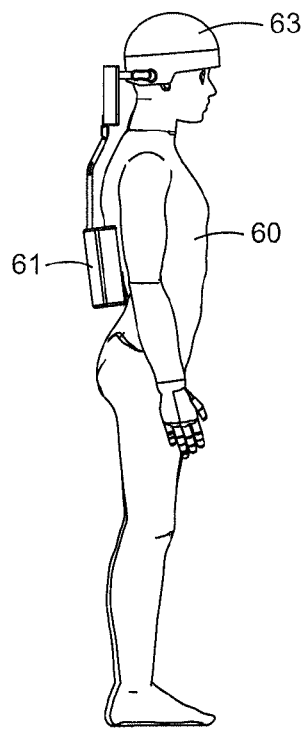
FIG. 28 is a side isometric view of a standing soldier (medic from FIG. 15) fitted with a SAPI (small arms protection inserts) panel affixed to his helmet.
Figure 29:
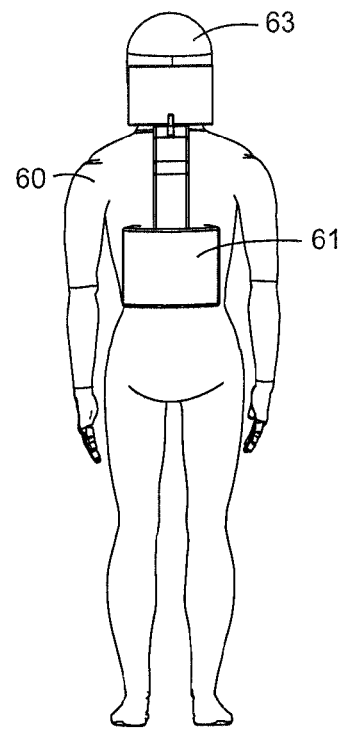
FIG. 29 is a rear view of the medic of FIG. 28 showing the back-carried SAPI unit.
Figure 30:
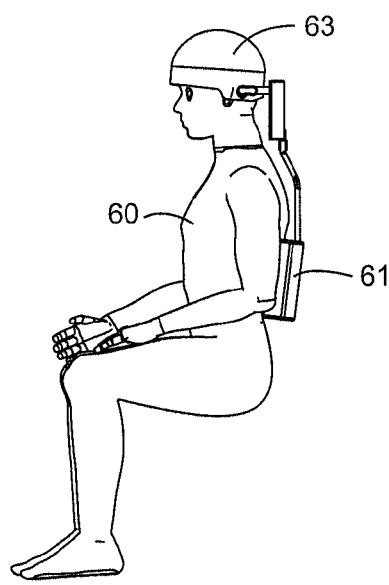
FIG. 30 is a side view of the medic seated, but still wearing the extended SAPI unit.
Figure 31:
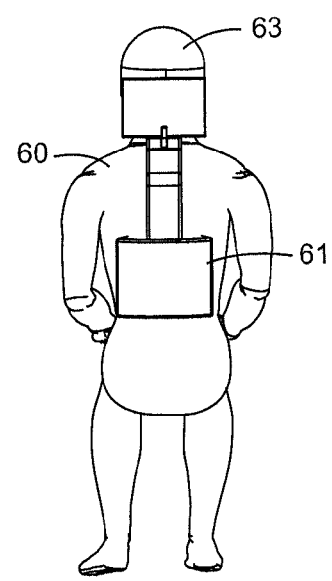
FIG. 31 is a rear view of the seated medic of FIG. 30.
Figure 32:
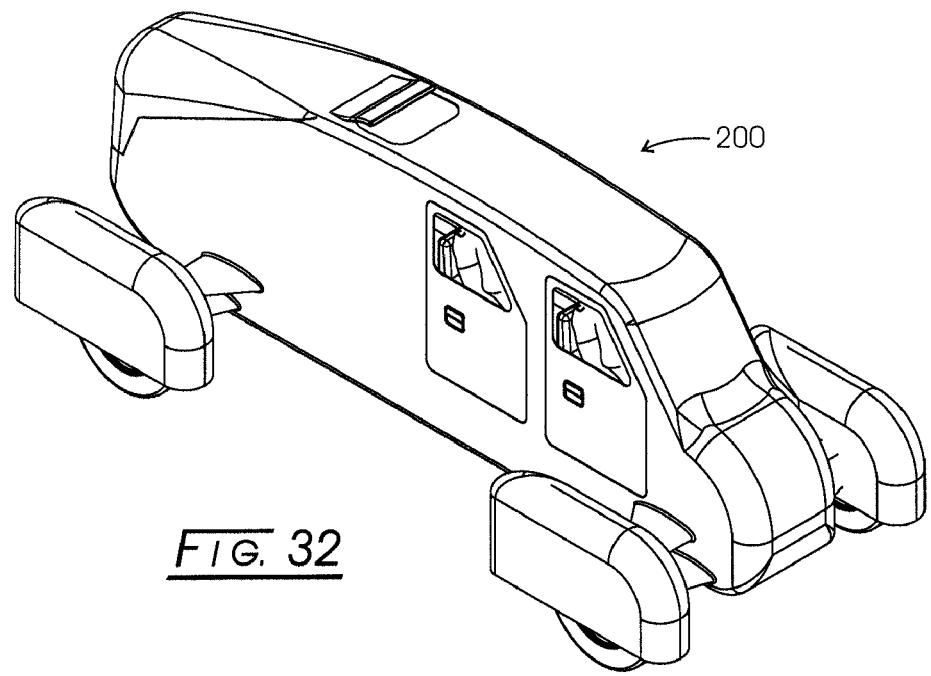
FIG. 32 is an isometric view of a streamlined modular passenger vehicle without side pods.

The design flexibility of the disclosed modular military vehicle is enveloped in FIG. 27. A troop transport only modular military vehicle, 161, is illustrated. In order to increase the troop capacity, a driver module, 163, has been widened behind the driver in order to accommodate additional instruments, material, goods, etc. Side troop modules, 165 and 167, accommodate another 2 soldiers each and are carried by an engine module, 169. Finally, a rear troop module, 171, accommodates another 6 soldiers. The total troop capacity of module military vehicle 161 is 11 troops. Additionally with widening the driver module slightly an additional 2 crew can be seated behind the driver as is represented in FIG. 30. This, then, would take the crew carrying capacity of this configuration to 13.

FIG. 36 expands upon the embodiment in FIG. 27 for a modular military vehicle, 300, which has an expanded driver module, 302, which has been widened for accommodating a driver in the forward position and 2 soldiers seated side-by-side behind the driver for a total of 3 troops in driver module 302. Side modules or side pods, 304 and 306, are troop pods adapted for 2 soldiers to be seated in each module. A rear module, 308, also can seat 3 soldiers. A spare tire, 310, is shown affixed to the side of rear module 308. FIG. 37 depicts the same basic vehicle 300, except that rear troop module 308 has been replaced with a cargo or armament module, 312. In both embodiment of vehicle 300, an overhead hatch, is located in the roof of driver module 302 for permitting a soldier to rise up for providing cover fire using rifle or other armament.

Commercial or civilian (non-military) versions of the modular vehicle are illustrated in FIGS. 32-35. In particular, a civilian modular vehicle, 200, is seen to be streamlined in design, but again using the in-line seating design to present a narrow head-on profile for vehicle 200. The rear module contains the engine, with a possible storage disposed behind the engine.

Figure 33:
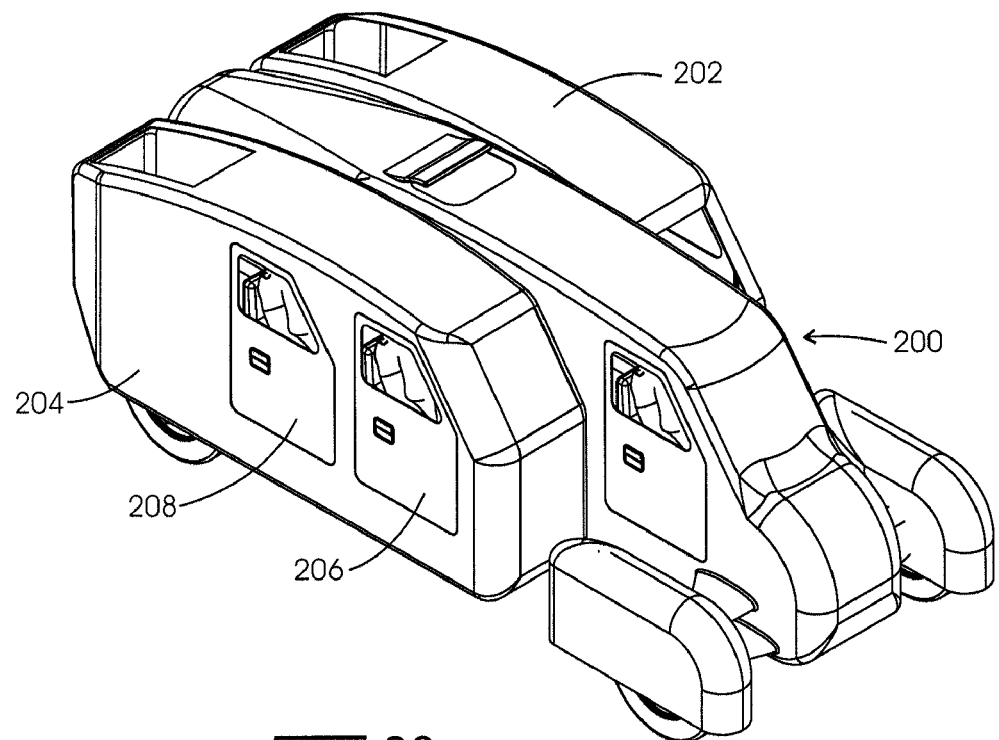
FIG. 33 is an isometric view of a streamlined modular passenger vehicle with side passenger pods.
Figure 34:
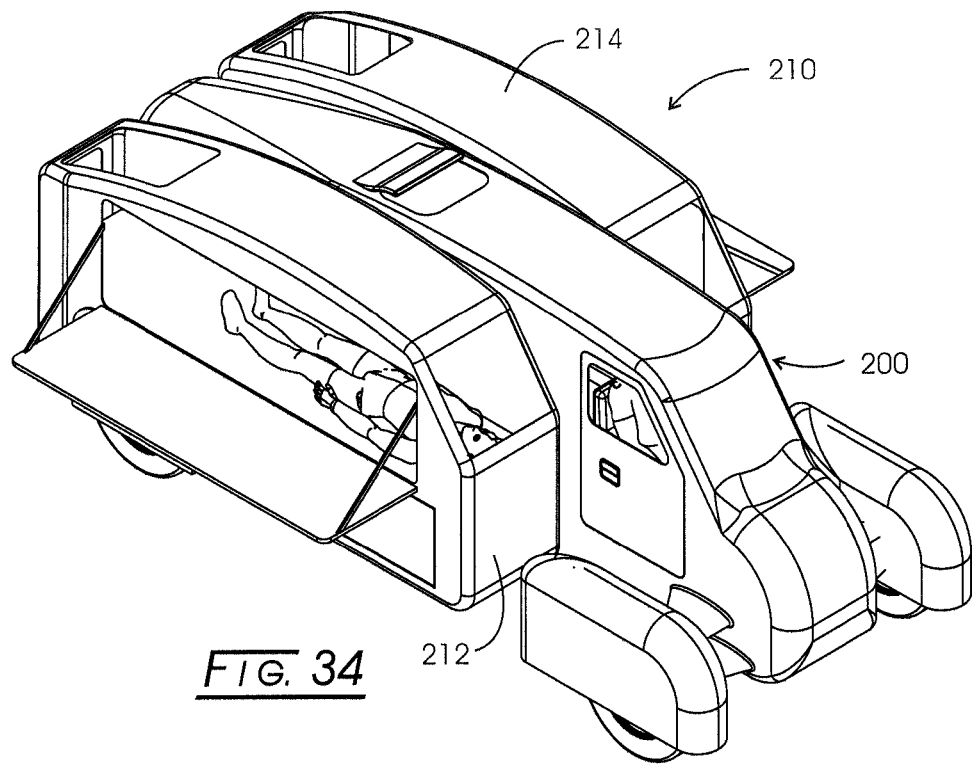
FIG. 34 is an isometric view of a streamlined camping modular vehicle with side pods.

In FIG. 33, side modules, 202 and 204, are hung onto the sides of vehicle 200. Entry for passengers in pods can be gained though doors, 206 and 208, placed in side module 208. Similar doors can be provided for side module 202 and for the driver. A camping version, 210, is illustrated in FIG. 34, where camp stretcher modules 212 and 214 (fitted with skylights), are hung onto the sides of vehicle 200. In this embodiment, the sides of vehicle 200 will be open to side modules 212 and 214 in order to provide such treatment.

Figure 35:
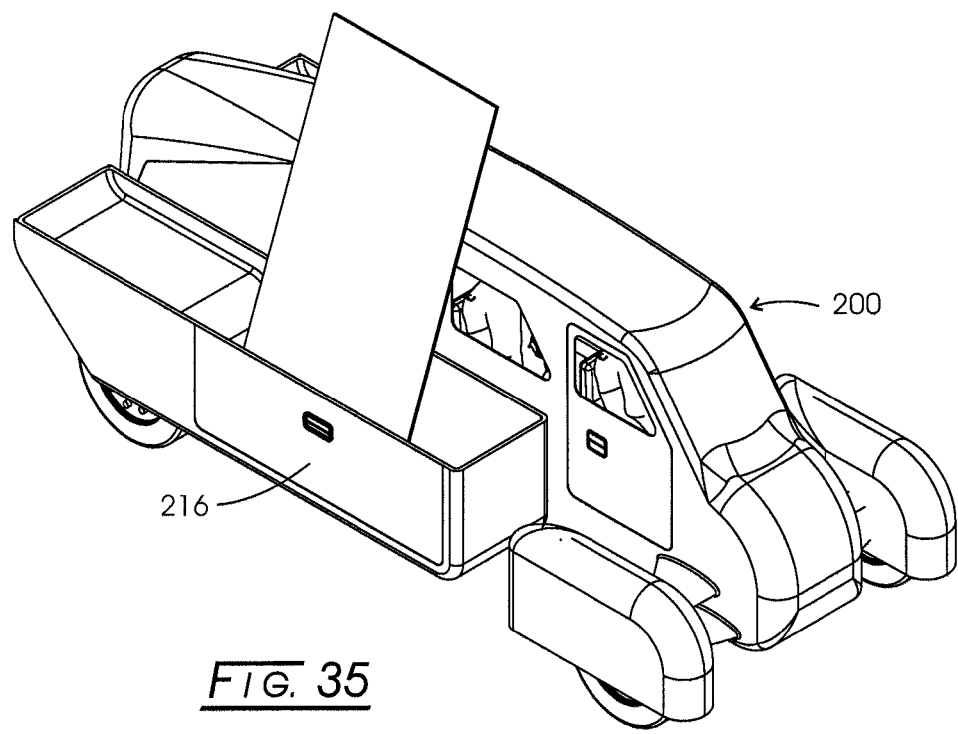
FIG. 35 is an isometric view of a streamlined passenger modular vehicle with cargo side pods.

A "pickup" version of the disclosed modular vehicle is illustrated in FIG. 35 where a side storage module, 216, is carried on one side of vehicle 200 and entry/exit doors are provided on the side opposite for ingress and egress of people into vehicle 200. Again, depending upon the design goals, a rear storage module can be carried at the rear of vehicle 200.

While the apparatus has been described with reference to various embodiments, those skilled in the art will understand that various changes may be made and equivalents may be substituted for elements thereof without departing from the scope and essence of the disclosure. Additionally, many modifications may be made to adapt a particular situation or material to the teachings of the disclosure without departing from the essential scope thereof. Therefore, it is intended that the disclosure may not be limited to the particular embodiments disclosed, but that the disclosure will include all embodiments falling within the scope of the appended claims. In this application the US measurement system is used, unless otherwise expressly indicated. Also, all citations referred to herein are expressly incorporated herein by reference.

I claim:

1. An armored vehicle hull, comprising:
    a first hull portion having a generally v-shaped cross section when viewed from a first direction; and
    a second hull portion having a generally v-shaped cross section when viewed from a first direction;
    said first and second hull portions spaced from each other in a second direction, approximately orthogonal to said first direction, to define at least one blast vent; wherein said hull is configured to engage with an armored land vehicle.

2. The hull of claim 1, further comprising a third hull portion, between said first hull portion and said second hull portion, having a generally v-shaped cross section.

3. The hull of claim 2, said third hull portion having a generally v-shaped cross section when viewed from a first direction.

4. The hull of claim 2, said third hull portion having a first slanted, upwardly extending side spaced in said first direction from a second slanted, upwardly extending side.

5. The hull of claim 2, wherein said first, second, and third hull portions each includes a first end, and wherein the first end of the third hull portion extends, in the first direction, beyond the first ends of the first and second hull portions.

6. The hull of claim 1, wherein said first direction is a direction running from the front of the hull to the rear of the hull, and said second direction is a direction running from a first side of the hull to a second side of the hull.

7. The hull of claim 1, wherein said first hull portion includes a generally planar side, said second hull portion includes a generally planar side, and said generally planar side of said first hull portion faces said generally planar side of said second hull portion.

8. The hull of claim 7, wherein at least one of said generally planar side of said first hull portion and said generally planar side of said second hull portion is approximately orthogonal to said second direction.

9. An armored vehicle, comprising:
    a hull including:
      a first hull portion having a generally v-shaped cross section when viewed from a first direction; and
      a second hull portion having a generally v-shaped cross section when viewed from a first direction;
      said first and second hull portions spaced from each other in a second direction, approximately orthogonal to said first direction, to define at least one blast vent;
      wherein said armored vehicle is an armored land vehicle.

10. The armored vehicle of claim 9, further comprising a third hull portion between said first hull portion and said second hull portion having a generally v-shaped cross section.

11. The armored vehicle of claim 10, said third hull portion having a generally v-shaped cross section when viewed from a first direction.

12. The armored vehicle of claim 10, said third hull portion having a first slanted, upwardly extending side spaced in said first direction from a second slanted, upwardly extending side.

13. The armored vehicle of claim 10, wherein said first, second, and third hull portions each includes a first end, and wherein the first end of the third hull portion extends, in the first direction, beyond the first ends of the first and second hull portions.

14. The armored vehicle of claim 9, wherein said first direction is a direction running from the front of the hull to the rear of the hull, and said second direction is a direction running from a first side of the hull to a second side of the hull.

15. The armored vehicle of claim 9, wherein said first hull portion includes a generally planar side, said second hull portion includes a generally planar side, and said generally planar side of said first hull portion faces said generally planar side of said second hull portion.

16. The armored vehicle of claim 15, wherein at least one of said generally planar side of said first hull portion and said generally planar side of said second hull portion is approximately orthogonal to said second direction.

17. The armored vehicle of claim 9, wherein said armored vehicle is a wheeled armored vehicle.

18. The armored vehicle of claim 9, wherein said armored vehicle further includes an open framework located within said blast vent.

19. The armored vehicle of claim 9, wherein said armored vehicle further includes at least one engine component located between said first and second hull portions.

20. A method of armoring a hull for an armored vehicle, comprising:
   providing a first hull portion having a generally v-shaped cross section when viewed from a first direction;
   providing a second hull portion having a generally v-shaped cross section when viewed from a first direction;
   defining at least one blast vent by spacing said first and second hull portions from each other in a second direction, approximately orthogonal to said first direction;
   wherein said vehicle is an armored land vehicle.

21. The method of claim 20, further comprising the step of providing a third hull portion having a generally v-shaped cross section.

22. The method of claim 21, further including the step of disposing said third hull portion between said first hull portion and said second hull portion.

* * * * *